US007725495B2

(12) United States Patent
Singh

(10) Patent No.: US 7,725,495 B2
(45) Date of Patent: May 25, 2010

(54) IMPLEMENTING REFERENTIAL INTEGRITY IN A DATABASE HOSTING SERVICE

(75) Inventor: Ram Pratap Singh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 932 days.

(21) Appl. No.: 11/401,522

(22) Filed: Apr. 11, 2006

(65) Prior Publication Data

US 2007/0239767 A1 Oct. 11, 2007

(51) Int. Cl.
G06F 17/30 (2006.01)
(52) U.S. Cl. ..................................... 707/802
(58) Field of Classification Search ............... 707/4
See application file for complete search history.

(56) References Cited

U.S. PATENT DOCUMENTS

| | | | | |
|---|---|---|---|---|
| 4,947,320 | A * | 8/1990 | Crus et al. ........................ | 1/1 |
| 5,499,359 | A | 3/1996 | Vijaykumar | |
| 5,608,898 | A | 3/1997 | Turpin et al. | |
| 5,787,432 | A | 7/1998 | LeTourneau | |
| 5,903,891 | A | 5/1999 | Chen et al. | |
| 5,950,210 | A * | 9/1999 | Nelson ............................ | 1/1 |
| 6,035,300 | A | 3/2000 | Cason et al. | |
| 6,141,663 | A | 10/2000 | Hunkins et al. | |
| 6,260,044 | B1 | 7/2001 | Nagral et al. | |
| 6,401,103 | B1 | 6/2002 | Ho et al. | |
| 7,028,057 | B1 * | 4/2006 | Vasudevan et al. ................. | 1/1 |
| 7,188,116 | B2 * | 3/2007 | Cheng ............................ | 1/1 |
| 7,240,054 | B2 * | 7/2007 | Adiba et al. ....................... | 1/1 |
| 7,328,212 | B2 * | 2/2008 | Voss et al. ........................ | 1/1 |
| 7,406,472 | B2 * | 7/2008 | Manucha et al. .................. | 1/1 |
| 2002/0095408 | A1 * | 7/2002 | Cheng ............................ | 707/3 |
| 2003/0078923 | A1 * | 4/2003 | Voss et al. ........................ | 707/7 |
| 2003/0187853 | A1 | 10/2003 | Hensley et al. | |
| 2003/0217034 | A1 * | 11/2003 | Shutt ............................. | 707/1 |
| 2003/0229610 | A1 * | 12/2003 | Van Treeck ....................... | 707/1 |
| 2005/0192989 | A1 * | 9/2005 | Adiba et al. ...................... | 707/101 |
| 2005/0223022 | A1 | 10/2005 | Weissman et al. | |
| 2006/0195460 | A1 * | 8/2006 | Nori et al. ........................ | 707/100 |

OTHER PUBLICATIONS

Duphiney, R., *REA: Real Estate Assistant for Windows Designed for Commercial Real Estate User's Manual*, © 1986-2003, REA, Inc., San Diego, Calif, pp. 1-58.
Li, W.-S., et al., "CachePortal II: Acceleration of Very Large Scale Data Center-Hosted Database-Driven Web Applications," *Proceedings of the 29th Very Large Data Base Conference*, Berlin, Germany, 2003.
Spendolini, S., "Oracle HTML DB: The Fastest Way to the Web," *ODTUG Technical Journal*, Dec. 2004, pp. 14-18.

* cited by examiner

*Primary Examiner*—Don Wong
*Assistant Examiner*—Sheree N Brown
(74) *Attorney, Agent, or Firm*—Merchant & Gould, P.C.

(57) ABSTRACT

Generally described, embodiments of the present invention provide the ability to assign primary keys and foreign keys to lists of any number of sites that are maintained by a database hosting service. More specifically, a scalable table, like the master table described below, may continue to be used without specifying primary keys or foreign keys within the table by using two additional tables in which the keys are specified for each list of each site. Integrity may be maintained by confirming that all changes to either a primary key or foreign key are appropriate before applying the changes to the master table.

20 Claims, 23 Drawing Sheets

MASTER TABLE 900

| SITE ID | LIST ID | INT1 | INT2 | INT3 | ... | CHAR1 | CHAR2 | ... |
|---|---|---|---|---|---|---|---|---|
| 1 | 1 | 2001 | | | | JOE | 123 STREET | |
| 1 | 1 | 2002 | | | | BOB | 456 AVENUE | |
| 1 | 1 | 2003 | | | | ANN | 1 PLACE | |
| 1 | 1 | 2004 | | | | JOE | 35 ROAD | |
| 1 | 1 | 2005 | | | | STEVE | 41 COURT | |
| 1 | 1 | 2006 | | | | SAM | 23 LANE | |
| 1 | 1 | 2007 | | | | ALAN | 90 CIRCLE | |
| 2 | 1 | 1 | 2 | 555-376-1234 | | SUSIE | | |
| 2 | 1 | 2 | 12 | 555-396-8523 | | STAN | | |
| 2 | 1 | 3 | 2 | 555-241-9988 | | BOB | | |
| 2 | 1 | 4 | 6 | 555-874-9874 | | STEVE | | |
| 2 | 1 | 5 | 25 | 555-893-7294 | | KEVIN | | |
| 2 | 2 | 1 | 2 | | | SUSIE | PRESIDENT | |
| 2 | 2 | 3 | 2 | | | BOB | VICE PRESIDENT | |
| 2 | 2 | 4 | 6 | | | STEVE | SECRETARY | |
| 2 | 2 | 5 | 25 | | | KEVIN | TREASURER | |
| 1 | 2 | 700 | 2001 | 1000 | | CN1001 | | |
| 1 | 2 | 700 | 2001 | 5000 | | CN1002 | | |
| 1 | 2 | 450 | 2001 | 500 | | CN1003 | | |
| 1 | 2 | 700 | 2002 | 10000 | | CN1004 | | |
| 1 | 2 | 350 | 2002 | 1500 | | CN1005 | | |
| 1 | 2 | 300 | 2003 | 850 | | CN1006 | | |
| 1 | 2 | 450 | 2003 | 300 | | CN1007 | | |
| 1 | 3 | 300 | | | | SUV | | |
| 1 | 3 | 350 | | | | TRUCK | | |
| 1 | 3 | 450 | | | | BIKE | | |
| 1 | 3 | 700 | | | | CAR | | |

*Fig. 9.*

PK CONSTRAINTS (1053)

| SITE ID | LIST ID | COLUMN ID |
|---------|---------|-----------|
| 1 | 1 | 1 |
| 2 | 1 | 1 |
| 1 | 3 | 2 |

*Fig.10A.*

FK RELATIONSHIPS (1077)

| SITE ID | LIST ID | COLUMN ID | PARENT LIST ID |
|---------|---------|-----------|----------------|
| 1 | 2 | 3 | 1 |
| 2 | 2 | 2 | 1 |
| 1 | 2 | 2 | 3 |

*Fig.10B.*

PK VALUE 1163

| SITE ID | LIST ID | VALUES |
|---|---|---|
| 1 | 1 | 2001 |
| 1 | 1 | 2002 |
| 1 | 1 | 2003 |
| 1 | 1 | 2004 |
| 1 | 1 | 2005 |
| 1 | 1 | 2006 |
| 1 | 1 | 2007 |
| 2 | 1 | 1 |
| 2 | 1 | 2 |
| 2 | 1 | 3 |
| 2 | 1 | 4 |
| 2 | 1 | 5 |
| 1 | 3 | 300 |
| 1 | 3 | 350 |
| 1 | 3 | 450 |
| 1 | 3 | 700 |

FK VALUE 1183

| SITE ID | LIST ID | COLUMN ID | VALUE | PARENT LIST ID |
|---|---|---|---|---|
| 1 | 2 | 3 | 2001 | 1 |
| 1 | 2 | 3 | 2001 | 1 |
| 1 | 2 | 3 | 2001 | 1 |
| 1 | 2 | 3 | 2002 | 1 |
| 1 | 2 | 3 | 2002 | 1 |
| 1 | 2 | 3 | 2003 | 1 |
| 1 | 2 | 3 | 2003 | 1 |
| 2 | 2 | 2 | 1 | 1 |
| 2 | 2 | 2 | 3 | 1 |
| 2 | 2 | 2 | 4 | 1 |
| 2 | 2 | 2 | 5 | 1 |
| 1 | 2 | 2 | 700 | 3 |
| 1 | 2 | 2 | 700 | 3 |
| 1 | 2 | 2 | 450 | 3 |
| 1 | 2 | 2 | 700 | 3 |
| 1 | 2 | 2 | 350 | 3 |
| 1 | 2 | 2 | 300 | 3 |
| 1 | 2 | 2 | 450 | 3 |

*Fig.11.*

IMPLEMENTING REFERENTIAL INTEGRITY IN A DATABASE HOSTING SERVICE

BACKGROUND

Generally described, database hosting services provide the ability for multiple users to create sites with one or more lists, or tables, and store data for those lists in a database maintained by the database hosting service. Such services typically provide the ability for each user of a site to create multiple lists for each site. The database hosting service presents those lists as independent units to the site. However, internally, most database hosting services maintain larger sets of tables with a collective of the information from all of the different tables of the different sites. The reason for this is that for a large number of users working with the database hosting service, the number of tables being created is very large. Beyond a certain threshold, a large number of tables causes scalability and bottlenecks within the database hosting service.

A database hosting service typically is able to scale better with a smaller number of tables that could individually have a very large number of rows. For example, a database hosting service might scale better with hundreds or thousands of tables with billions of rows in each table than with millions of tables, even if those tables had very few rows in each. Accordingly, most database hosting services generate a small set of extremely large tables with a large number of columns and rows for various data types and maintain information from different user sites in the small subset of extremely large tables. While such a model provides good scalability in terms of numbers of lists that can be stored in the database, it suffers from the problems of not being able to maintain relationships between tables of a site or perform integrity checks between tables of a particular site.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, embodiments of the present invention provide the ability to assign primary keys and foreign keys to lists of any number of sites that are maintained by a database hosting service. More specifically, a scalable table, like the master table described below, may continue to be used without specifying primary keys or foreign keys within the table by using two additional tables in which the keys are specified for each list of each site. Integrity may be maintained by confirming that all changes to either a primary key or foreign key are appropriate before applying the changes to the master table.

In accordance with one aspect, a method for providing primary keys for a plurality lists of a plurality of sites maintained by a database hosting service, wherein data from the plurality of lists are maintained in a master table, is provided. The method receives an assignment request and determines a site identifier, list identifier, and column identifier from which the request was received. This information is maintained in a primary key table and may be used to define the primary key for the list and to confirm that it is unique.

In accordance with another aspect, a computer-readable medium having computer executable components for maintaining foreign keys for a plurality of lists for a plurality of sites maintained by a database hosting service is provided. The components include a processing component, a foreign key values component, and a referential integrity component. The processing component is configured to receive a foreign key assignment and determine a site identifier, list identifier, column identifier, and related list identifier for the foreign key assignment. The foreign key values component maintains the determined site identifier, list identifier, column identifier, and related list identifier, and determines a value contained in a column identified by the column identifier. The referential integrity component confirms that the determined values match values contained in a column of a list identified by the related list identifier.

In accordance with still another aspect, a computer system for hosting a plurality of sites containing a plurality of lists is provided. The computer system includes one or more databases storing information that is managed for the plurality of sites and a computing device in communication with the one or more databases. The computing device is operative to generate a master table containing values included in the plurality of lists, generate a foreign key value table maintaining values of a plurality of foreign keys for the plurality of lists, and generate a primary key value table maintaining values of a plurality of primary keys for the plurality of lists.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 is a block diagram of a master table maintained and populated by a host in response to users creating multiple lists on multiple sites as described in the example of FIGS. 1-8;

FIGS. 10A and 10B are block diagrams of a primary key constraint table and foreign key relationship table, both of which are generated and maintained by a host in response to users creating multiple sites having multiple lists, as described in the example of FIGS. 1-8;

FIG. 11 is a block diagram of a primary key values table and a foreign key values table, both of which are generated and maintained by a host in response to users creating multiple sites having multiple lists, as described in the example of FIGS. 1-8;

DETAILED DESCRIPTION

Generally described, embodiments of the present invention provide a database hosting service, referred to herein as a host, which allows any number of users to create sites wherein each site contains any number of lists containing any number of columns and rows with any types of data or values. Additionally, embodiments of the present invention provide the ability for users to assign "primary keys," "foreign keys," and create relationships between different lists of a site. A "primary key," as used herein, is a column of data in which each value maintained in the column is unique. A "foreign key," as used herein, refers to a column that can only have values that match values contained in a column of another list on a site. In addition, embodiments of the present invention provide the ability to include referential integrity support between multiple lists of a site. For example, embodiments of the present invention may specify that a foreign key may only refer to and relate to a primary key of another list within a user's site and, upon entry, addition, or deletion of data in either a primary key or a foreign key, the related column from the related list is checked to ensure that there will be no integrity problems resulting from the change.

Figure 12:
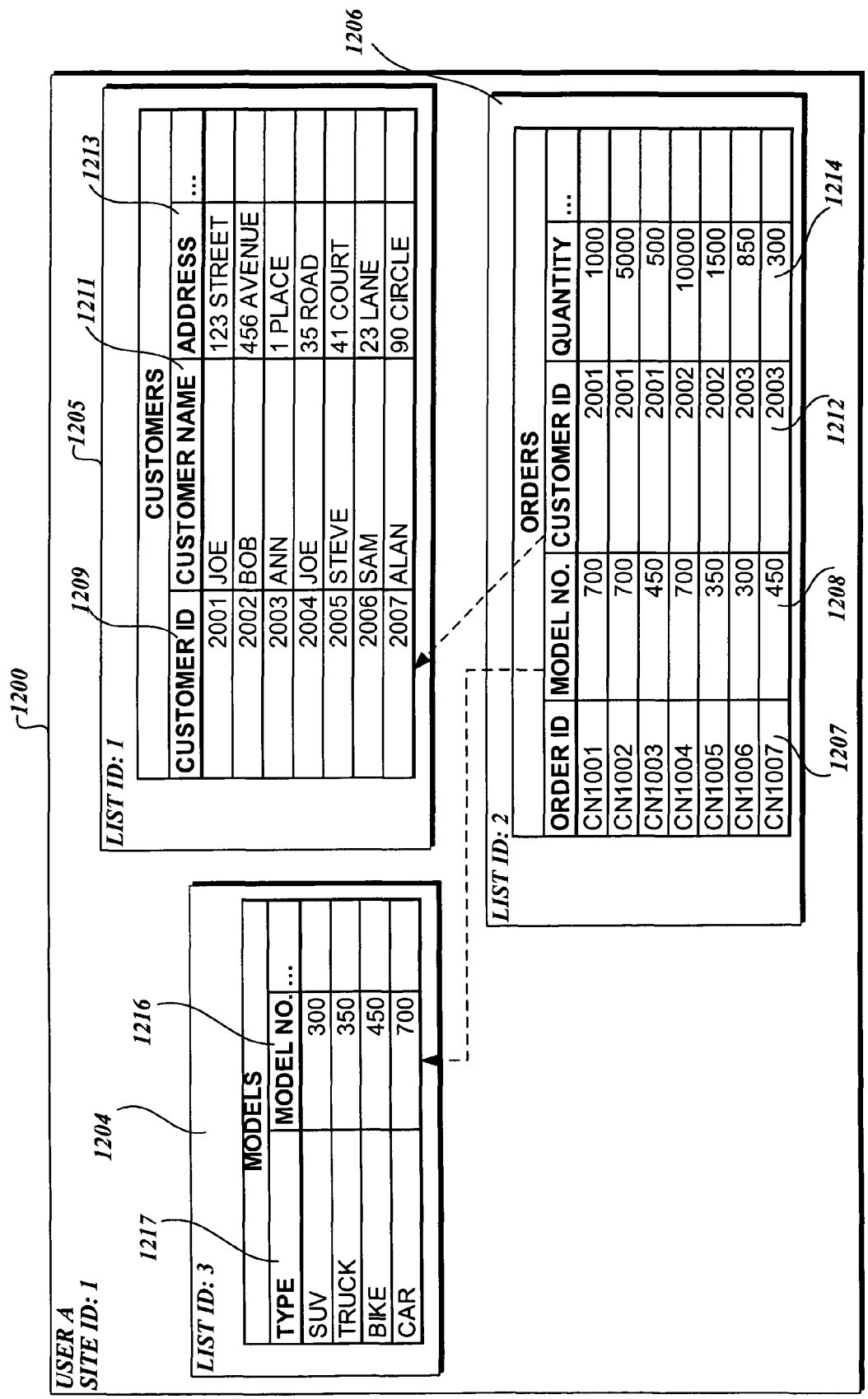
FIGS. 12 and 13 are block diagrams of two different sites created by users, as described in the example of FIGS. 1-8.

At an initial point, user A 101 requests the creation of a site that is to be maintained by a host 150. Upon receipt of a request to create a site by the host 150, the host 150 generates and assigns a unique site ID 103 that will be utilized internally by the host 150 to identify and track information that is generated and related to the site 100 that is being created for user A 101. Upon assigning a site ID 103, such as site ID "1," the host 150 creates the site with the assigned site ID 103. Referring to FIG. 2, upon creation of a site 100, user A 101 requests the creation of a customers list 105. The host 150, upon receipt of a request to create a customers list 105 from user A 101, assigns a unique list ID 107 identifying the list that is created for user A's site 100 and allows creation of the customers list 105 with the assigned list ID 107. For example, the list ID 107 assigned to customers list 105 may be a list ID of "1." As part of this example, user A 101, in creating the customers list 105, may specify a column within the customers list 105 that is to be used as the primary key for that list 105. Referring to FIG. 12, user A's site 1200 may be created and the customers list 1205 with the list ID of "1" may be established for that site 1200. As part of the creation process, user A 101 may identify that the first column 1209 with the heading of "CUSTOMER ID" is to be assigned as a primary key for the list. The host 150, upon receipt of identification of a primary key assignment for the customers list 105, updates a primary key constraints table 153 (FIG. 1) that is maintained internally by the host 150 to quickly identify the primary keys for the different lists created by different users on different sites that are maintained by the host 150. Referring to FIG. 10A, for example, upon receipt from user A's site identifying that the first column of the customers list 105 is to be assigned as the primary key, the host 150 enters the site ID 1054, list ID 1055, and column ID 1056 for the site 1200, list 1205, column 1209, identified as the primary key for user A's 101 site 1200 in the primary key constraints table 1053. As will be described in more detail below, because all information from different lists of different sites is maintained in one master table 151 (FIG. 1), to identify what data refers to a primary key for a particular site, the host 150 maintains information regarding the site ID, list ID, and column ID of the primary key in a primary key constraints table 1053. The combination of site ID, list ID, and column ID will be unique for each site, thereby providing the ability to identify and track multiple primary keys for different lists and different sites all in one table.

Referring back to FIG. 2, and continuing with the example described herein, upon addition of the site ID, list ID, and column ID in a primary key constraints table 153, the host 150 confirms that there is no other conflicting primary key for the customers list 105. In one embodiment of the present invention, the host 150 may specify that only one primary key may be generated and maintained for each list of a particular site. However, it will be appreciated that embodiments of the present invention may allow for multiple primary keys to be maintained for each list of a site.

As part of the creation of the customers list 105, user A 101 populates the list with different values in each of the different columns. Referring again to FIG. 12, for example, user A 101 may add values into the customer ID column 1209, the customer name column 1211, the address column 1213, etc. Any type of value, text, or information may be included in the list 1205 that is maintained and hosted by the host 150. As the customers list 1205 is populated with data, the host 150, as described in more detail below, determines if the data relates to a primary key and, if so, confirms that there are no conflicting values contained in the column assigned as the primary key. If the entered data is added to a primary key and there are no conflicting values, the primary key values table (FIG. 11) is updated to identify the site ID 1164, list ID 1165, and value 1166 that have been added to the list. For example, if the user adds a value of 2001 in the customer ID column 1209 (FIG. 12), the host 150 confirms that the value entered in the column assigned as the primary key does not already exist in that column. Once it is confirmed that the value does not exist, the value is added to the primary key values table 1163 along with the site ID and list ID.

Figure 1:
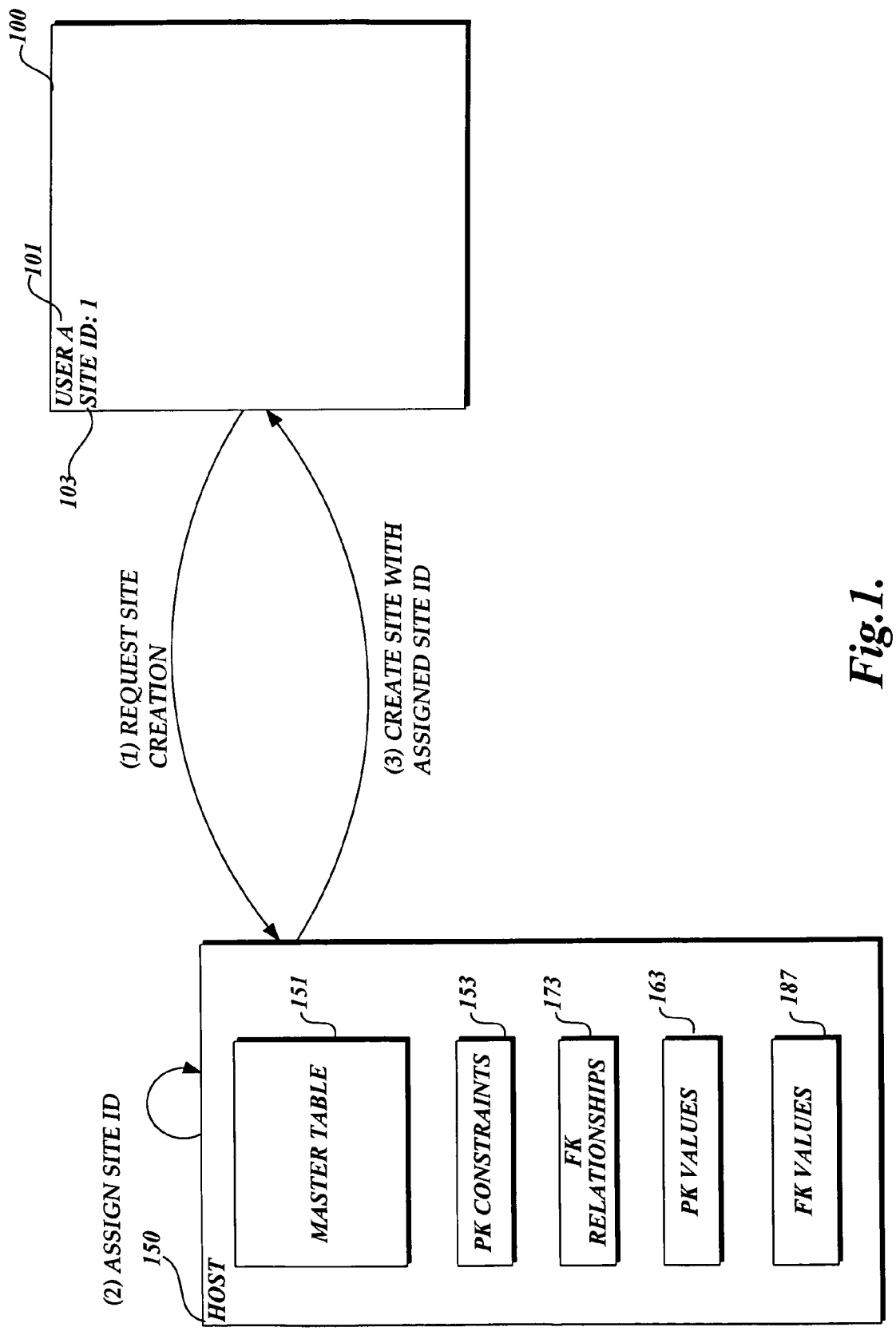
FIGS. 1-8 are block diagrams of a transition between a host and two users creating different sites, each site including a plurality of lists in accordance with an embodiment of the present invention.
Figure 2:
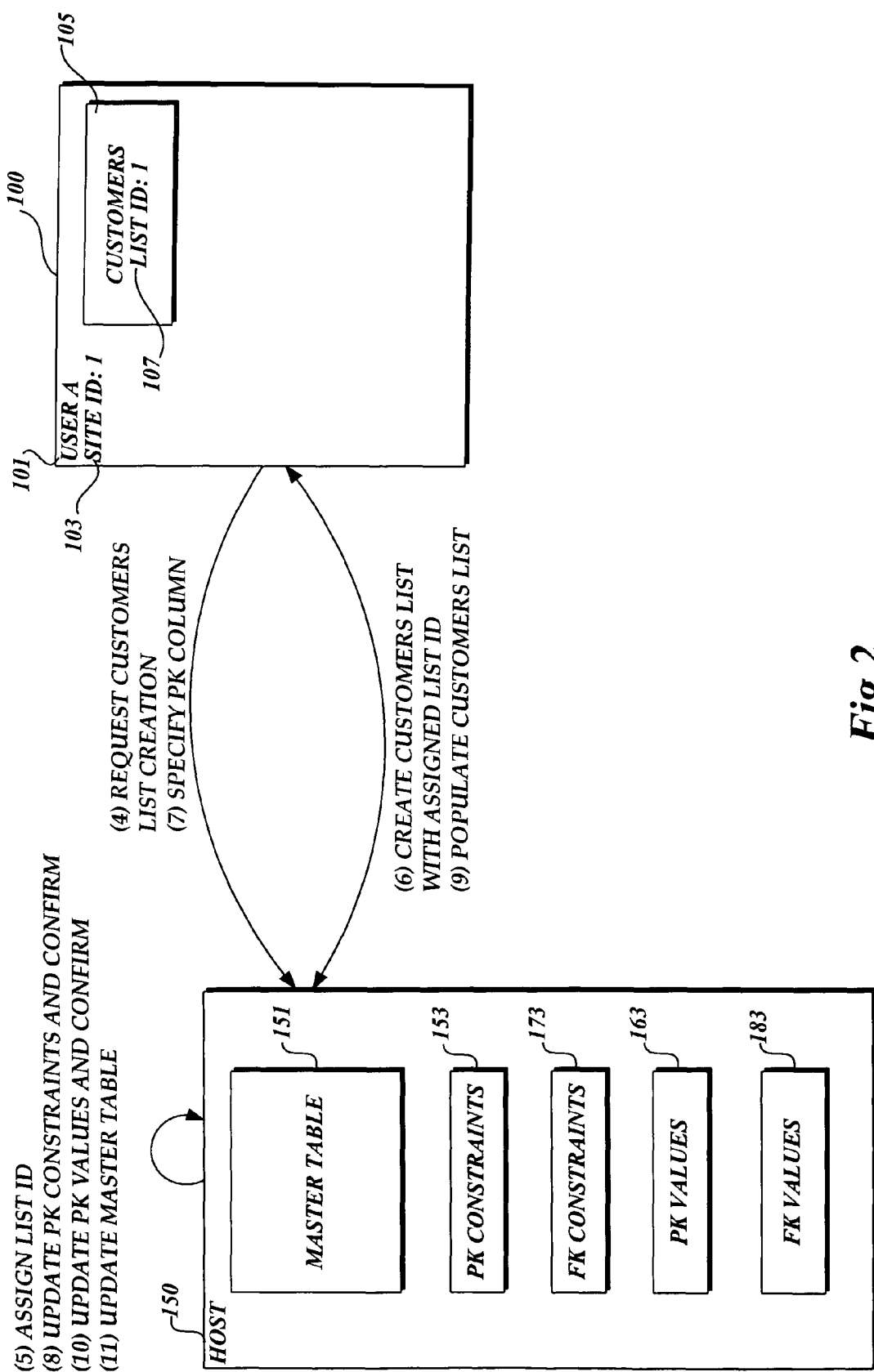

In addition, the values of primary keys that are added by user A 101 to the customers list 1205 are added to a master table 151 (FIG. 1). Referring to FIG. 9, a master table 900 may be one large table maintained by host 150 that includes several predefined columns that are used to maintain data from different lists of different sites. Included in the master table 900 are a site ID column 901, a list ID column 903, and a variety of different format-type columns that are used to maintain data for the different lists of the different sites managed by host 150. For example, there may be a preset number of integer-type columns 905, a preset number of character-type columns 907, and any other type of data input that may be included in a list that is maintained by host 150. For example, the master table 900 may also include several columns for date and time entries, currency entries, etc.

Referring to the customers table 1205, the master table 900 maintains the information based off the site ID, in this example, site ID "1," the list ID, in this example, list ID "1," and includes data from the different columns of different types in the first available column type associated with the values entered. For example, the values entered in the customer ID column 1209 are added to the first available integer column 905. Likewise, the data entered in the customer name column 1211, which are characters, is added to the first character column 907 of the master table 900. The host 150 also maintains additional information for the lists being generated by different sites such as the column headers, sizing, arrangement, color, font, etc., that are used to regenerate the tables when requested for viewing by a user of a site.

Figure 3:
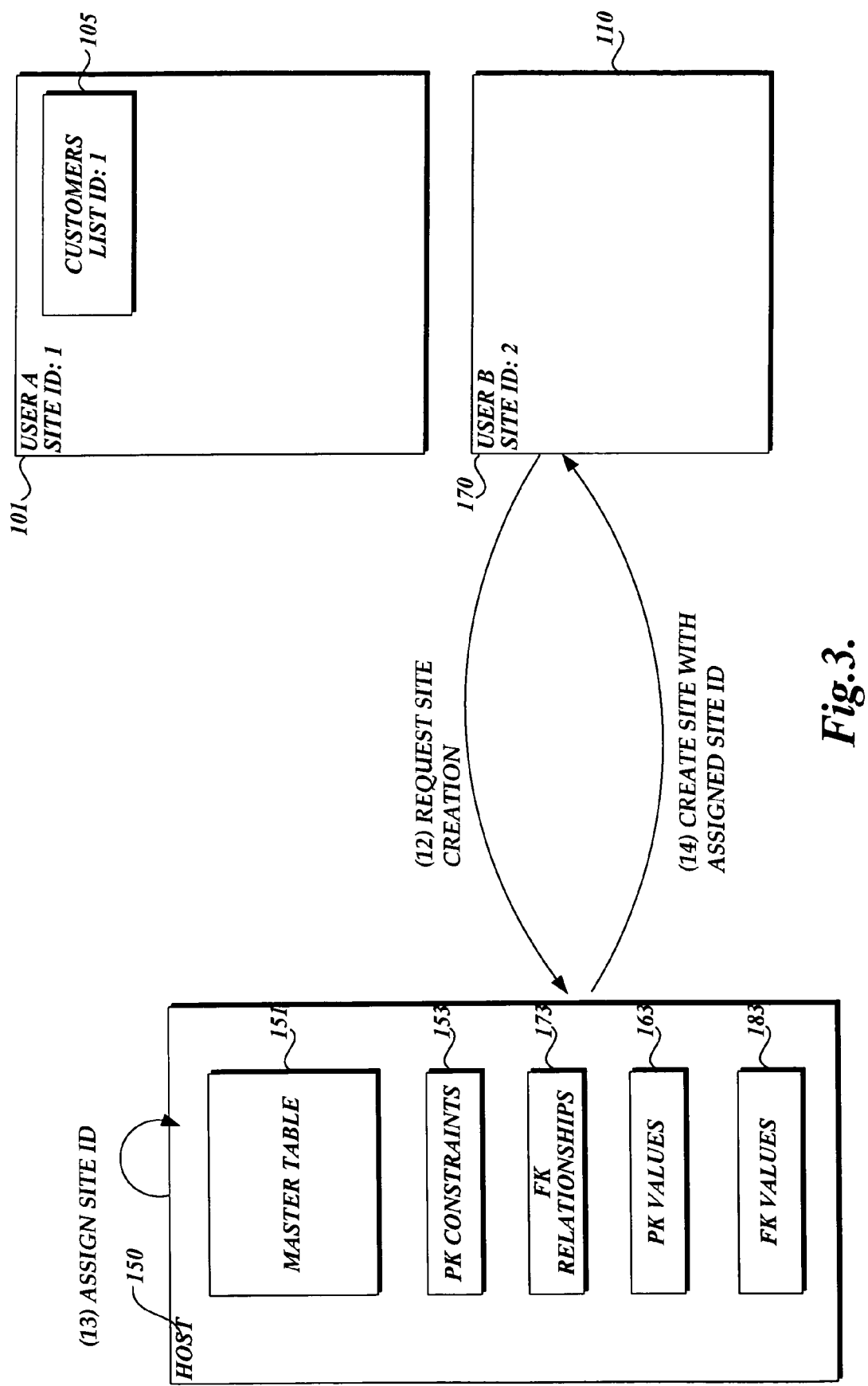
Figure 4:
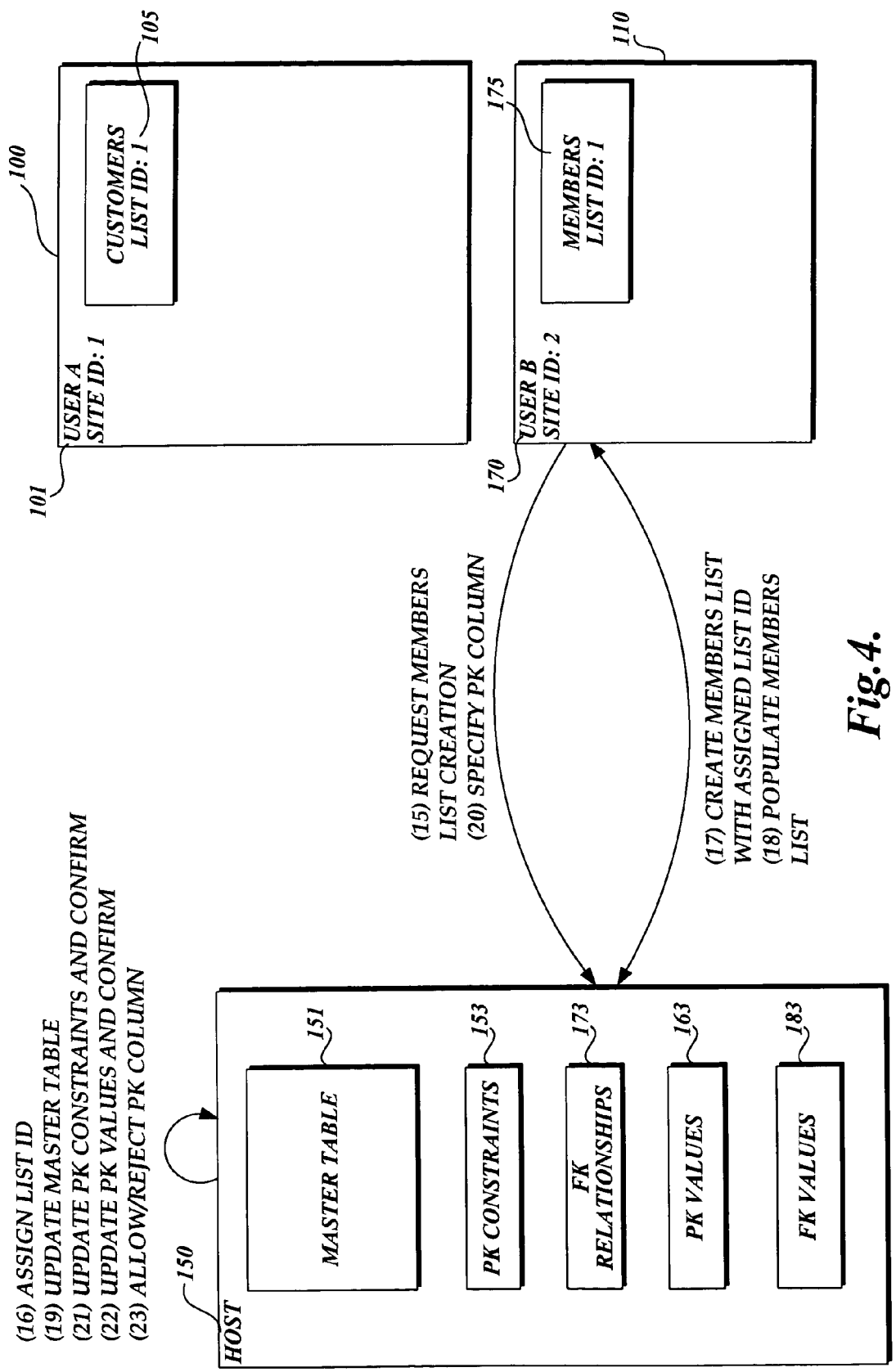

Continuing with the above example and referring to FIG. 3, at some point a second user, user B 170, requests creation of a site that is to be managed and maintained by the host 150. Similar to creation of a site for user A 100, the host 150 generates and assigns a site ID and allows creation of a site for user B 170. For example, the site ID generated and assigned for the site created for user B may be a site ID of "2." Referring to FIG. 4, in this instance, user B 170 requests creation of a members list 175 that is to be maintained and managed by the host 150. As with above, the host 150 assigns a list ID for the newly created list for user B's site and allows creation of the members list 175. For example, the list ID for the members list may be a list ID of "1." The only requirement in generating list IDs is that the list ID for each list is unique for each individual site. For example, the list ID of "1" for the customers list 105 is unique for user A's site. Likewise, the list ID of "1" for the members list 175 on user B's site is unique for that site as well.

Figure 13:
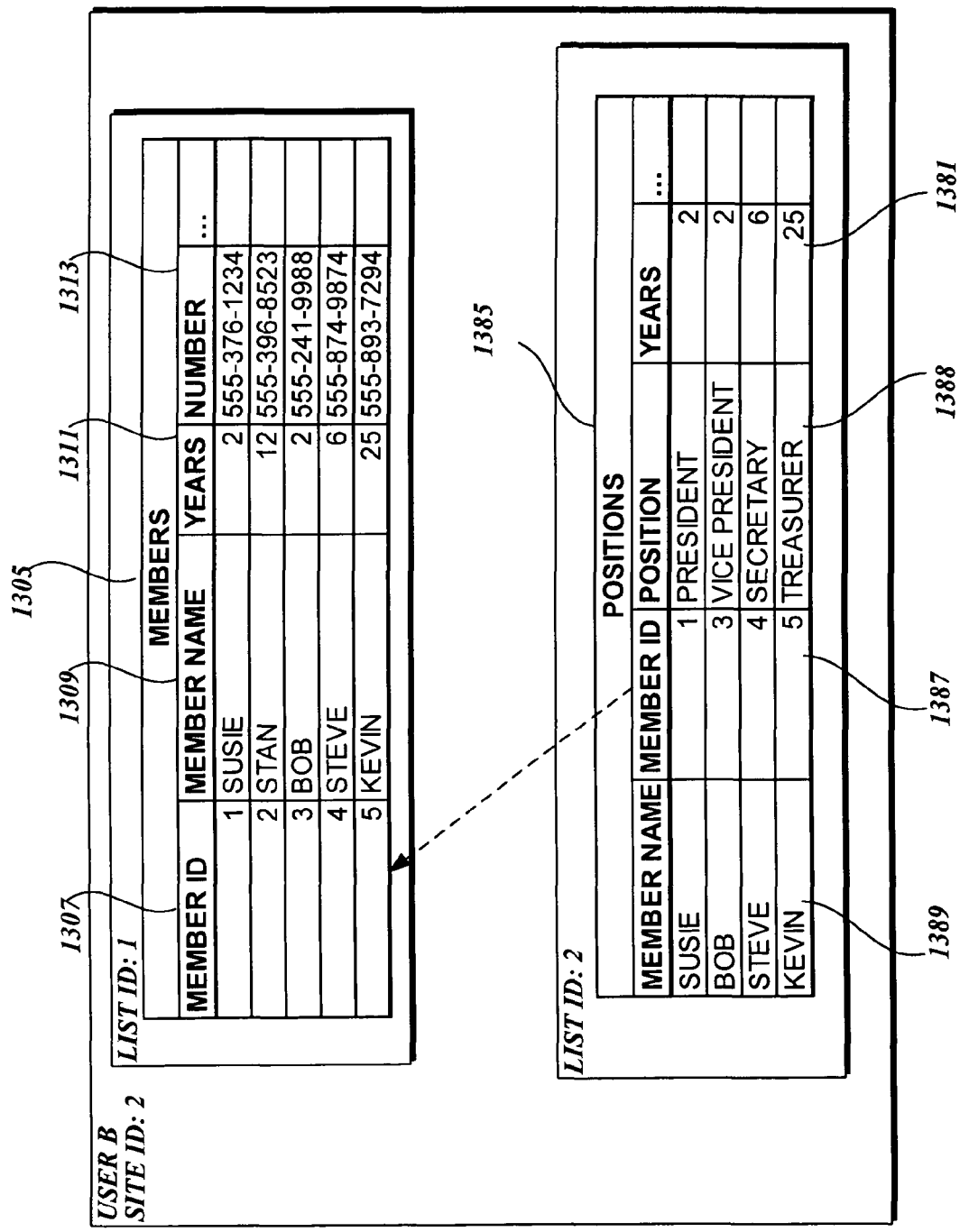

In this example, user B 170 populates the different columns of the members list 175 with values. For example, referring to FIG. 13, the members list 1305 may include four columns 1307, 1309, 1311, 1313 in which user B 170 includes values. The host 150, upon receipt of values that are to be included in the members list 175, adds the values to the master table 151 that is maintained by the host 150. In particular, referring to the master table 900 (FIG. 9) in adding the values that are included in the members list 175, the host 150 includes the appropriate site ID, in this example, site ID "2," the appropriate list ID, in this example list ID "1," and the values included in the different columns of the members list as they are provided by user B 170. For example, the values included in the member ID column 1307 are added to the first available integer column 905 of the list 900 and the values of the member name column 1309 of the members list are added to the first available character column 907 of the master table 900. Even though the values for the members list 175 of user B's site are maintained in the same master table 900 as the values of the customers list 105 of user A's site, the values may be easily distinguished because each row of entries in the master table 900 identifies the site and list for which the values are associated.

Returning to FIG. 4, after population of the members list 175, user B 170 identifies a column that is to be assigned as the primary key for the members list 175. In contrast to the example of user A generating a customers list 105 specifying a primary key before values are entered, user B 170 enters the values prior to specifying the primary key. In this instance, the host 150 updates the primary key constraints table 153 with identification of the site ID, list ID, and identified column ID for the column to be assigned as the primary key. In this example, referring again to FIG. 13, a user may specify that the member ID column 1307 is to be used as the primary key. Thus, the host 150 may specify in the primary key constraints table (FIG. 10A) a site ID of "2" in the site ID column 1054, a list ID of "1" in the list ID column 1055, and a column ID of "1" in the column ID column 1056. In addition to updating the primary key constraints table 153, the host 150 adds the values already populated in the identified column to the primary key values table 163 along with the site ID and list ID for that table. For example, referring to FIG. 11, the host 150 adds a site ID of "2" in the site ID column 1164, a list ID of "1" in the list ID column 1165, and each of the different values maintained in the member ID column 1303 of the members list 1305. The host then confirms that there are no other rows with the same values in the site ID, list ID, and values cells in the primary key value table, thereby confirming that the column assigned as the primary key for the members list 1305 includes unique values. Assuming all of the values of the identified column are unique, the host 150 allows the identified column be used as the primary key for the members list 175.

Figure 5:
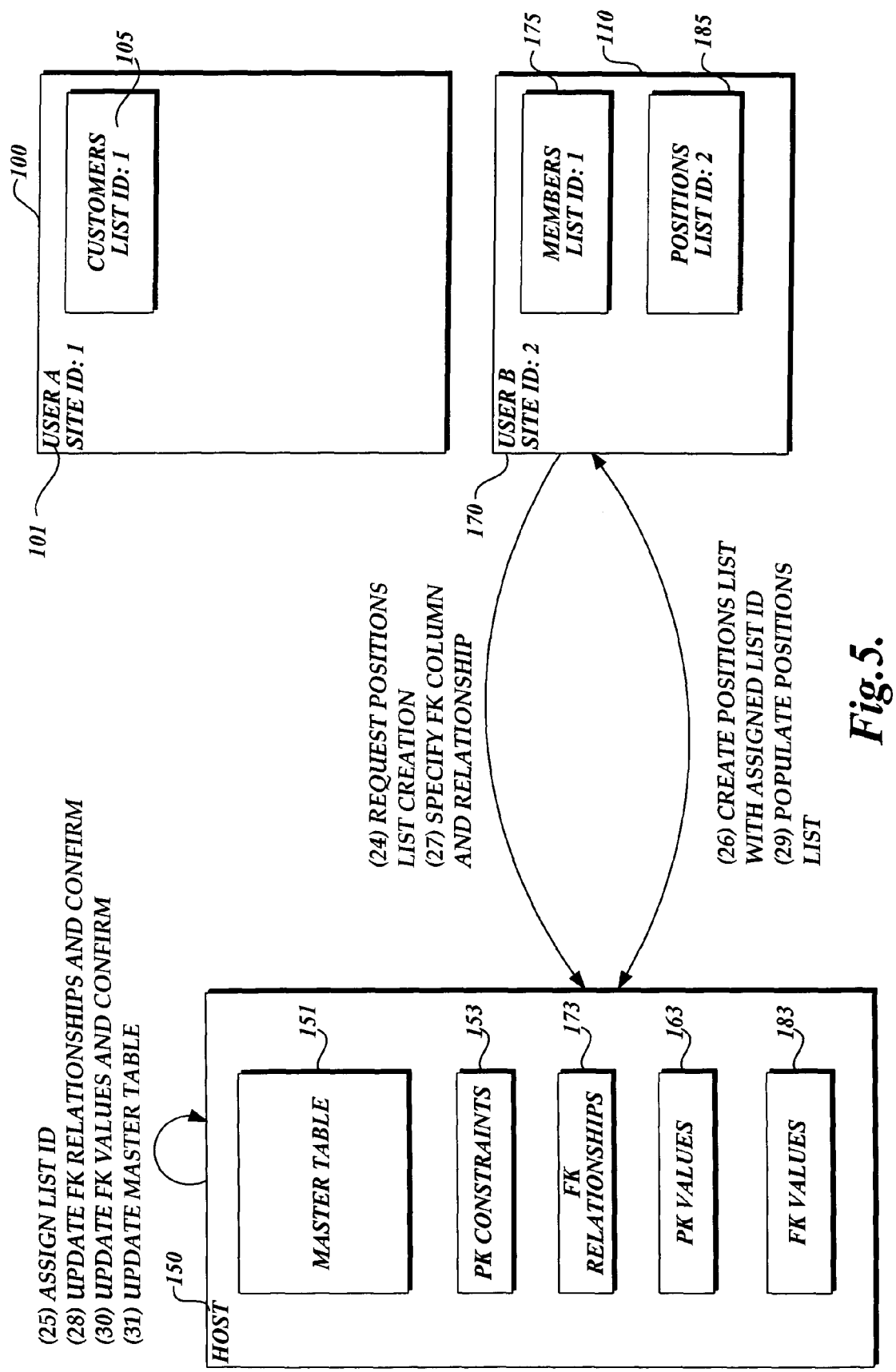

Referring to FIG. 5 and continuing with the example, user B requests creation of a positions list 185. As with the above, the host 150, upon receipt of a request to create a positions list 185, assigns a unique list ID to the positions list 185 and allows creation of the positions list 185 on user B's 170 site 110. In this example, user B 170 specifies a column that is to be used as a foreign key and the relationship to another list on user B's 170 site 110. In this example, referring to FIG. 13, a positions list 1385 may include four columns: member name 1389, member ID 1387, position 1388, and years 1381. User B 170 may specify that the member ID column 1387 is to be assigned as the foreign key. As noted above, a foreign key may only include values that are also included in a related column, in this example, the column assigned as a primary key 1307 of the members list 1305. As can be seen from FIG. 13, each of the values contained in the member ID column 1387 are also contained in the member ID column 1307 of the members list 1305. Upon identification of a column that is to be assigned as the foreign key, the host 150 updates the foreign key relationships table and confirms that the relationship being used for the foreign key is appropriate. In one embodiment, the relationship must refer to a primary key of another list within the same site.

Referring to FIG. 10B, the foreign key relationships table 1073 maintains the site ID, list ID, and column ID for the site, list, and column for which the foreign key is identified. For example, referring back to FIG. 13, if a user specifies the member ID column 1387 as the foreign key for the positions list 1385, the host 150 will maintain in the foreign key relationships table 1073 a site ID of "2" in the site ID column 1074, a list ID of "2" in the list ID column 1075, and a column ID of "2" in the column ID column 1076 thereby identifying the site, list, and column of the foreign key specified by user B 170. In addition, if user B 170 had specified the member ID column 1307 of the members list 1305 as the referenced column, the foreign key relationship table 1073 would maintain a parent list ID of "1" identifying the parent members list 1305 that has a list ID of "1." In this example, because only one primary key may be maintained for each list, the parent column ID of the related column may not be specified, as it will always be the primary key identified by the user. However, if multiple primary keys are allowed for a single list, the foreign key relationships table may include an additional column identifying the parent column ID for the referenced column.

Referring again to FIG. 5, after the user has specified the foreign key for the positions list 185, the user populates different values into the columns of the positions list 185. As with the examples above, the host 150, upon receiving values for the different columns of a list, adds those values, along with the appropriate site ID and list ID, to the master table 151. In addition, prior to addition to the master table 151, if a value is being entered into the identified foreign key, the host 150 updates the foreign key values table 183 and confirms that the value being entered actually exists in the related column, in this example, the related primary key of a different list in the same site. For example, referring to FIGS. 11 and 13 together, if the user enters a value of "1" in the member ID column 1387, the host adds the site ID, list ID, column ID, and the entered value into the foreign key values table 1183 and also includes the parent list ID for the list containing the primary key that is related by the foreign key.

A relationship is maintained by the different columns of the primary key values table 1163 and the foreign key values table 1183. In particular, a relationship is maintained between the site ID column 1164 of the primary key table 1163 and a site ID column 1184 of the foreign key values table 1183. Likewise, a relationship is maintained between the parent list ID column 1187 and the list ID column 1165 of the primary key values table 1163. Additionally, the values table 1187 of the foreign key values table 1183 and the values column 1166 of the primary key values table 1163 are also related. In this example, if a user enters a value of "1" in the foreign key member ID column 1387 (FIG. 13), the site ID of "2" is added to the site ID column 1184 of the foreign key values table 1183, a list ID of "2" is entered into the list ID column 1185, a column ID of "2" is entered into the column ID column 1186, and a value of "1" is included in the value column 1187. The host 150 then confirms that there is an entry in the primary key values table 1163 that includes the same site ID, the same list ID, the same value, and the related list ID. In particular, the parent list ID, which identifies the list to which the foreign key relates, matches the list ID of the primary key values table 1163. Assuming an equivalent entry is found between the two tables 1163 and 1183, the host 150 allows entry of the values into the column assigned as the foreign key to be added to the master table 150.

Figure 6:
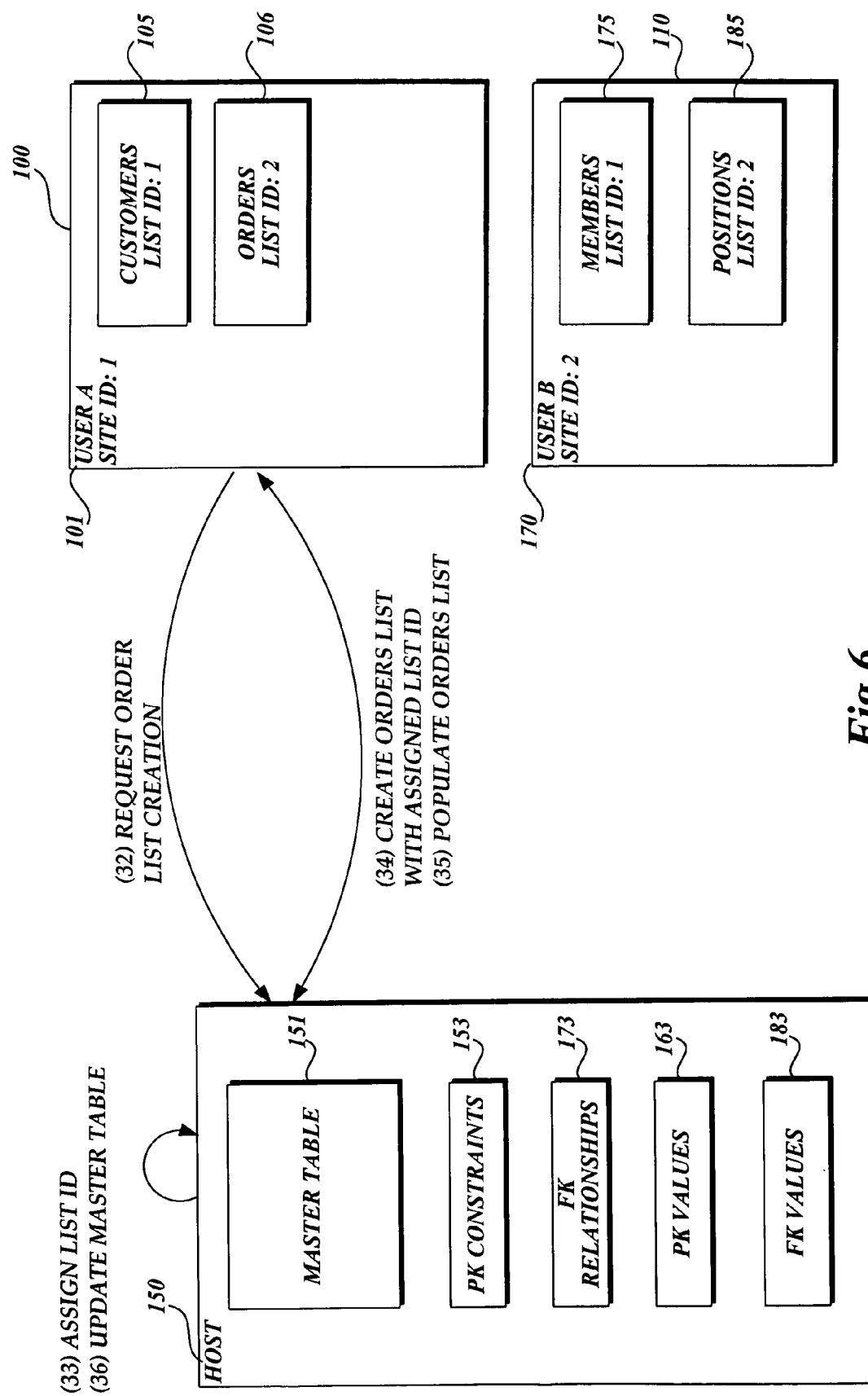
Figure 7:
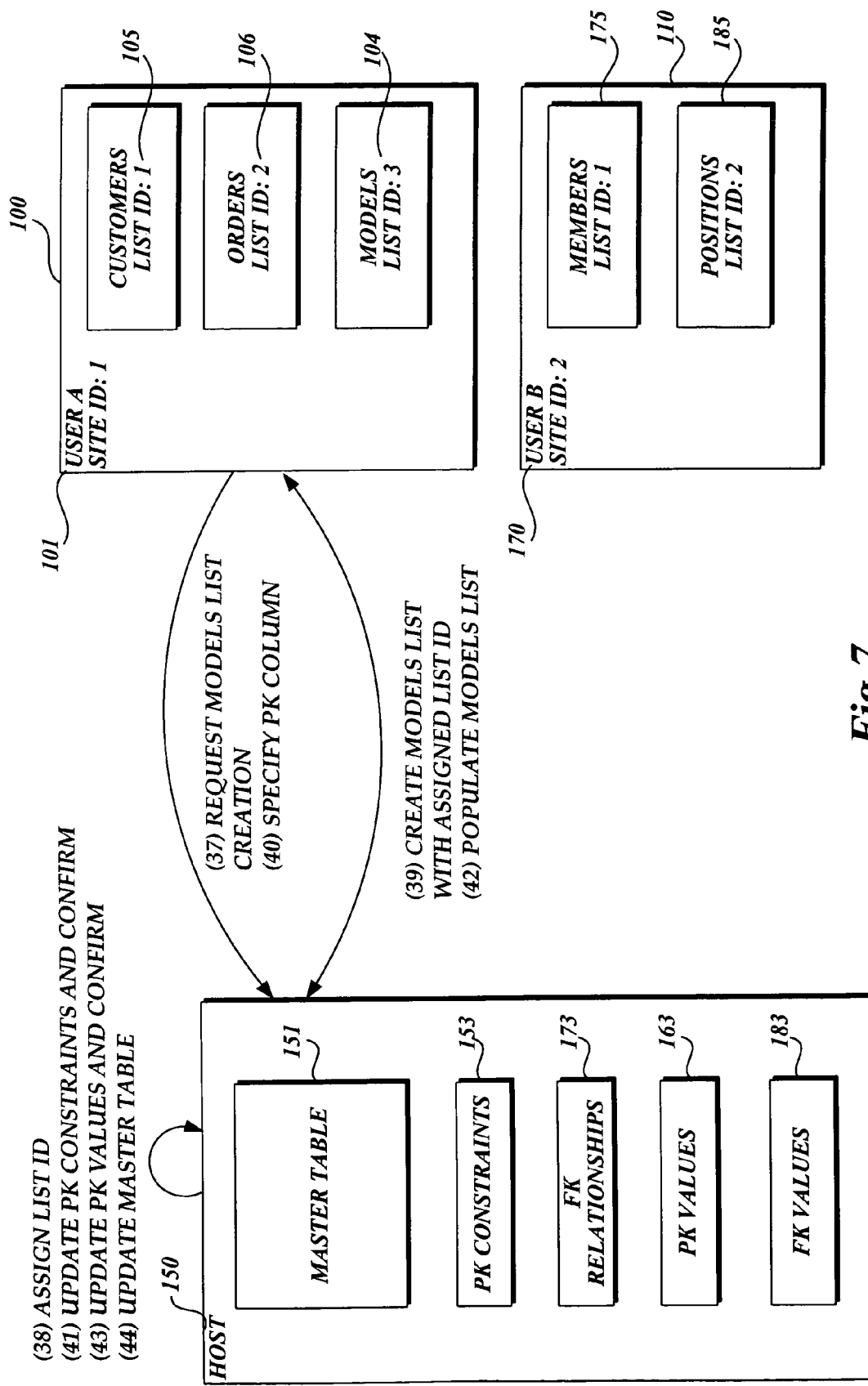

Moving now to FIG. 6 and continuing with the example, user A 101 requests a second list, an orders list 106, be created on the site 100. As with above, the host 150 assigns a list ID to the orders list, in this example, a list ID of "2," and allows creation of the orders list with the assigned list ID. Before identifying a primary key or a foreign key, user A 101 populates the orders list with different values to be included in that list. For example, returning to FIG. 12, an orders list 1206 with a list ID of "2" may be created that includes four columns containing different values. In this example, user A 101 creates an order ID column 1207, a model number column 1208, a customer ID column 1212, and a quantity column 1214. As can be seen from the example, user A is tracking customers, orders, and as will be discussed below, model numbers for those orders in different lists that are each interrelated with one another. Upon creation of the orders list 106, user A 101 populates the orders list with values that are included in each of the different columns. As can be seen from FIG. 7, after creation of the orders list, user A 101 may request creation of a third list on the site 100 such as a models list 104. As with the other lists for the sites, the host 150 assigns a unique list ID and allows creation of the models list 104 on user A's 101 site 100.

Upon creation of the models list 104, user A 101 specifies a column to be assigned as the primary key for the models list 104. Referring to FIG. 12, in this example, the user specifies the model number column 1216 to be assigned as the primary key for the models list 1204. As can be seen from a comparison of the different lists created by user A, any column of any list may be specified as a primary key and any column or columns in a list may be specified as the foreign keys. As with the above descriptions, the host 150, upon receipt of identification of a primary key for a list, the host updates the primary key constraints table 1053 (FIG. 10A) and confirms that there is not an existing primary key for the list. Continuing with this example, upon identification and approval of a primary key for the models list 1204, the user populates the models list 104 with values of data that is to be included in each of the different columns of the models list 104. As discussed above, each time a value is entered in the column assigned as the primary key, in this example, the model number column 1216 of the models list 1204, that value, site ID, and list ID are added to the primary key values table. A confirmation is made that the combination of those three entries are unique within the primary key values table 1163, thereby confirming that the value entered in the models list 1204 is unique for that column. Upon confirmation that the value added to the column assigned as the primary key of the models list 104 is unique, that value is updated in the master table 151.

Figure 8:
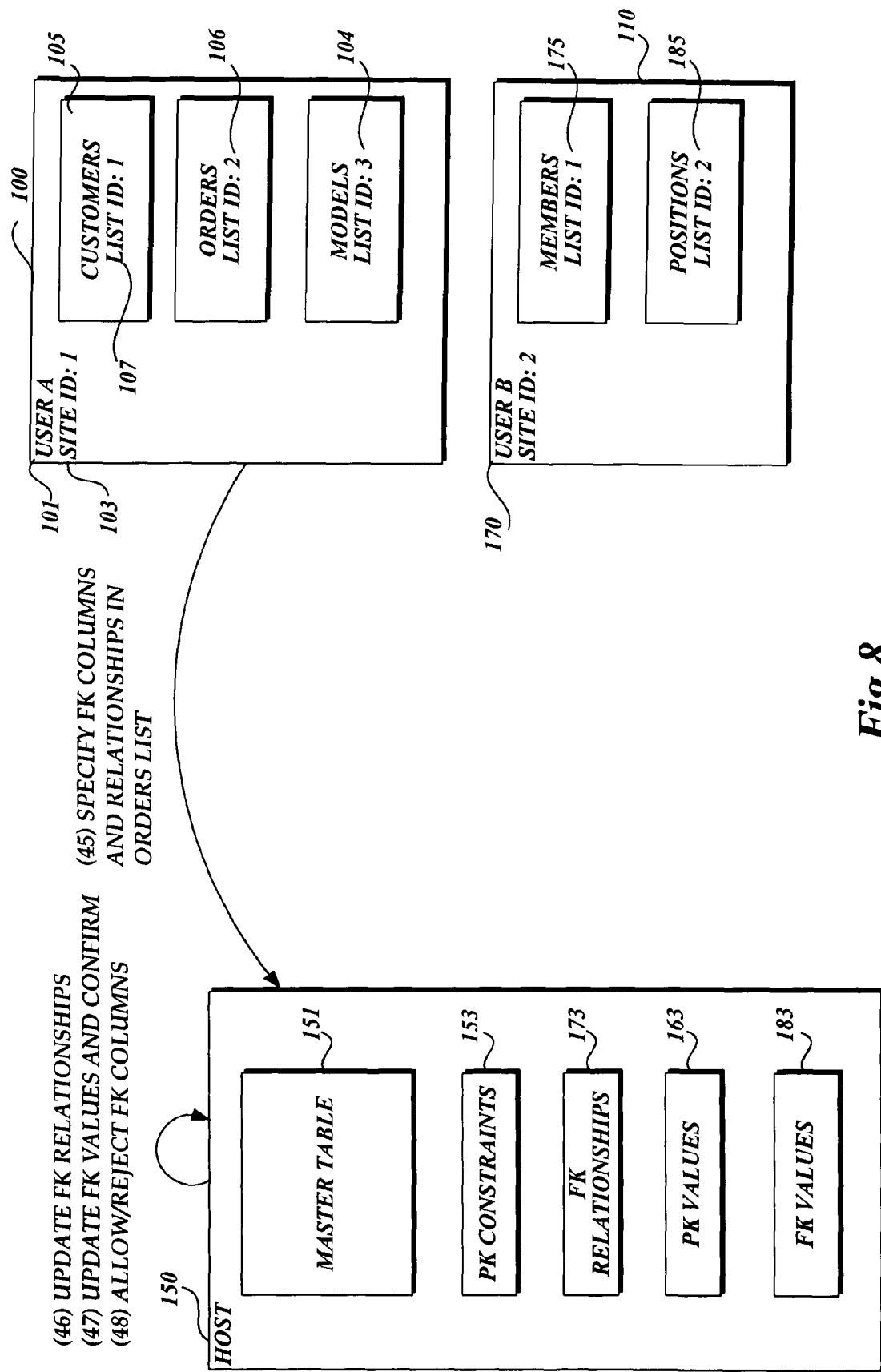

Finally, referring to FIG. 8, user A 101 specifies columns to be assigned foreign keys in the orders list 106 and relationships for those columns in each of the customers list 105 and the models list 104. As will be noted, any number of columns may be used as foreign keys in a particular list and each foreign key may reference the same or different primary keys within the same site in accordance with an embodiment of the present invention. Referring again to FIG. 12, in this example, user A 101 specifies that the model number column 1208 of the orders list 1206 is to be a foreign key and is to refer to the model number column 1216 of the models list 1204. Likewise, user A 101 specifies that the customer ID column 1212 of the orders list 1206 is also to be assigned as a foreign key. That foreign key is set to reference the primary key of customer ID 1209 from the customers list 1205. Upon receipt of the foreign key assignment and relationships, the host 150 updates the foreign key relationships table 1073 (FIG. 10B) as described above, and confirms that the values contained in the foreign keys are also contained in the referenced primary key. Upon confirmation that the values in the respective foreign key columns are also maintained in the referenced primary key columns of the other lists of user A's site, the host 150 allows the selection of the model number column 1208 and customer ID column 1212 as foreign keys. If there is a conflict in one of the values, the host 150 rejects the addition and may inform the user of the problem and allow the user the opportunity to correct the problem or remove the request.

Figure 14:
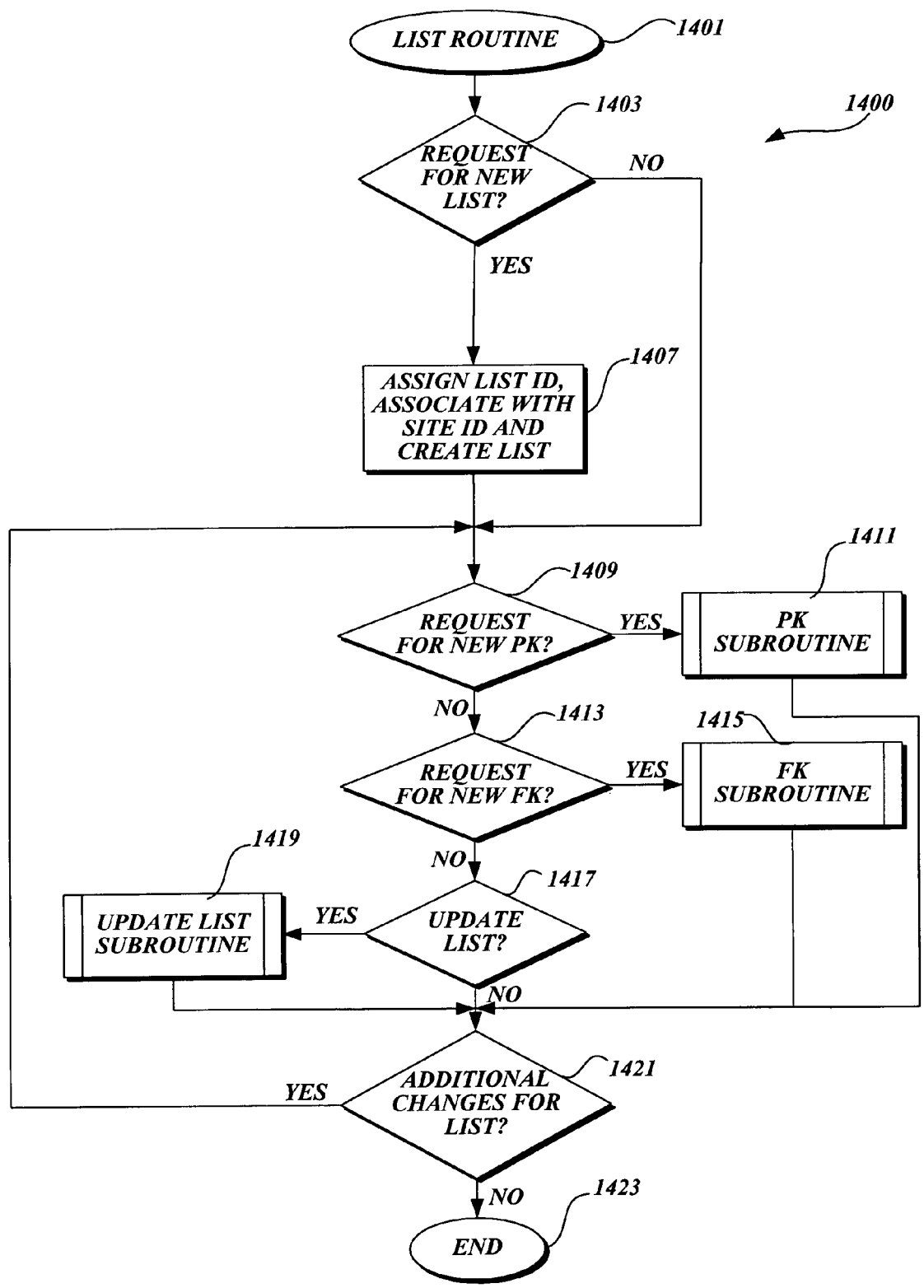
FIG. 14 is a flow diagram of a list routine for creating and updating lists within a site that are maintained by a database hosting service in accordance with an embodiment of the present invention.

FIG. 14 is a flow diagram of a list routine for creating and updating lists within a site that are maintained by a database hosting service in accordance with an embodiment of the present invention. The list routine 1400 begins at block 1401 and at decision block 1403, a determination is made as to whether the received request is a request for a new list creation. If it is determined at decision block 1403 that a received request is a request for a new list, at block 1407 a unique list ID is generated and associated with the list to be created and with the site in which the list is created. Upon creation and assignment of a list ID at block 1407 or if it is determined at decision block 1403 that a request for a new list has not been received, at decision block 1409 a determination is made as to whether the request includes an assignment of a column as a primary key for the list. If it is determined that a primary key assignment has been received, at decision block 1409, the primary key subroutine is performed, as illustrated by subroutine block 1411 and described in more detail with respect to FIG. 15 below. However, if it is determined at decision block 1409 that a primary key assignment has not been received, a determination is made as to whether a foreign key column has been identified. If it is determined at decision block 1413 that a foreign key column has been identified, the foreign key subroutine is performed, as illustrated by block 1415 and described in more detail below with respect to FIG. 16.

If it is determined at decision block 1413 that a foreign key assignment has not been received, at decision block 1417, a determination is made as to whether the list is to be updated. If it is determined at decision block 1417 that the list is to be updated, the update list subroutine is performed, as illustrated by subroutine block 1419 and described in detail below with respect to FIGS. 17-17F. However, if it is determined at decision block 1417 that the list is not to be updated, upon completion of the update list subroutine at subroutine block 1419, upon completion of the primary key subroutine at subroutine block 1411, or upon completion of the foreign key subroutine at subroutine block 1415, at decision block 1421 a determination is made as to whether additional changes for the list are to be made. If it is determined at decision block 1421 that additional changes for the list are to be made, control returns to decision block 1409 and the routine 1400 continues. However, if it is determined at decision block 1421 that additional changes for the list are not to be made, the routine 1400 completes as illustrated by block 1423.

Figure 15:
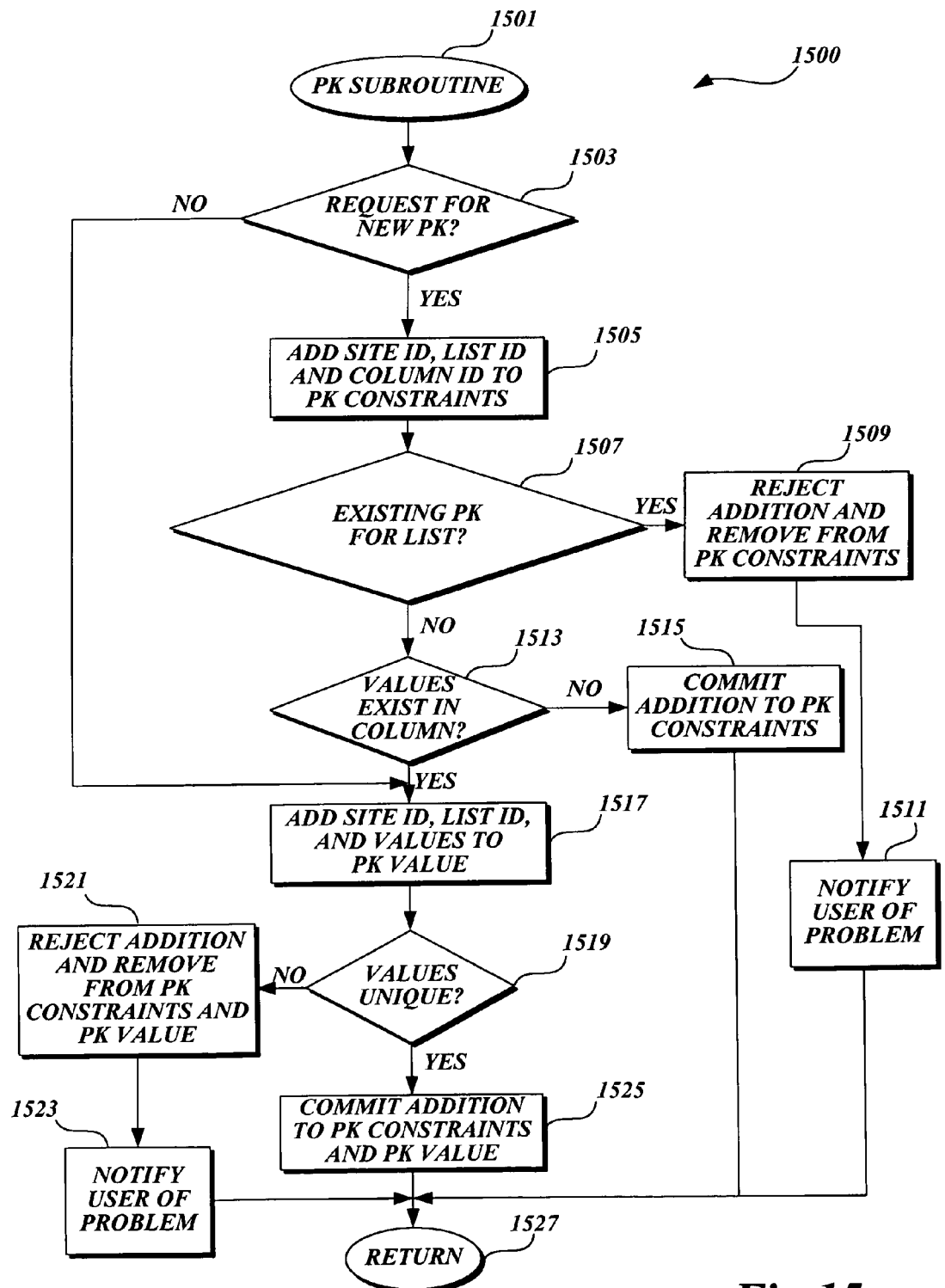
FIG. 15 is a flow diagram of the primary key ("PK") subroutine for creating, updating, and modifying primary keys of a list that is maintained by a database hosting service in accordance with an embodiment of the present invention.

FIG. 15 is a flow diagram of the primary key ("PK") subroutine for creating, updating, and modifying primary keys of a list that is maintained by a database hosting service, such as the host 150 described above in accordance with an embodiment of the present invention. The primary key subroutine 1500 begins at block 1501 and at decision block 1503 it is determined whether the request includes an assignment for a new primary key. If it is determined at block 1503 that the request is for a new primary key, at block 1505 a site ID, list ID, and column ID identifying the site, list, and column for which the assignment has been received is added as a row to the primary key constraints table maintained by the database hosting service. At decision block 1507 a determination is made by comparing the row of entries added at block 1505 with other rows of the primary key constraints table to determine whether a primary key for the list already exists. If it is determined at decision block 1507 that a primary key for the list currently exists, at block 1509 the requested addition is rejected and the entries added to the primary key constraints table at block 1505 are removed from that table. In addition, at block 1511, a user may be notified that the requested addition of a primary key has been rejected. While embodiments of the present invention utilize implementation of a list having only one primary key, alternative embodiments are envisioned in which multiple primary keys may be maintained for each list. Regardless of the number of primary keys, the only constraint for a primary key is that each of the values in the assigned column be unique.

Returning to decision block 1507, if it is determined that a primary key does not exist for the list, at decision block 1513 a determination is made as to whether values currently exist in the column that is being assigned a primary key. If it is determined at decision block 1513 that no values exist, the entries added to the primary key constraints table at block 1505 are committed and the requested assignment is approved. However, if it is determined at decision block 1513 that values do exist, at block 1517 the values contained in the column are added to the primary key values table. Additionally, each row in the primary keys values table containing a value from the column identified as the primary key also has a site ID and list ID identifying the site and list from which the values are added.

At decision block 1519 a determination is made as to whether each of the values in the column is unique. In one embodiment, by simply comparing the added rows containing the site ID, list ID, and value to the other rows of the primary key values table and determining if any two rows are identical specifies whether the values are unique. If two rows are identical, then two or more values of the column are not unique. However, if each of the rows of the primary key values table is different, then the values in the requested column are unique. If it is determined at decision block 1519 that the values are not unique, at block 1521 the requested addition is rejected and the entries added to the primary key constraints table at block 1505 and the entries added to the primary key values table at block 1517 are removed. Additionally, at block 1523 a user may be notified that one or more of the values is not unique.

If it is determined at decision block 1519 that the values of the requested column are unique, at block 1525 the entries added to the primary key constraints table at block 1505 and the entries added to the primary key values table at block 1517 are committed and the subroutine completes at block 1527.

Figure 16:
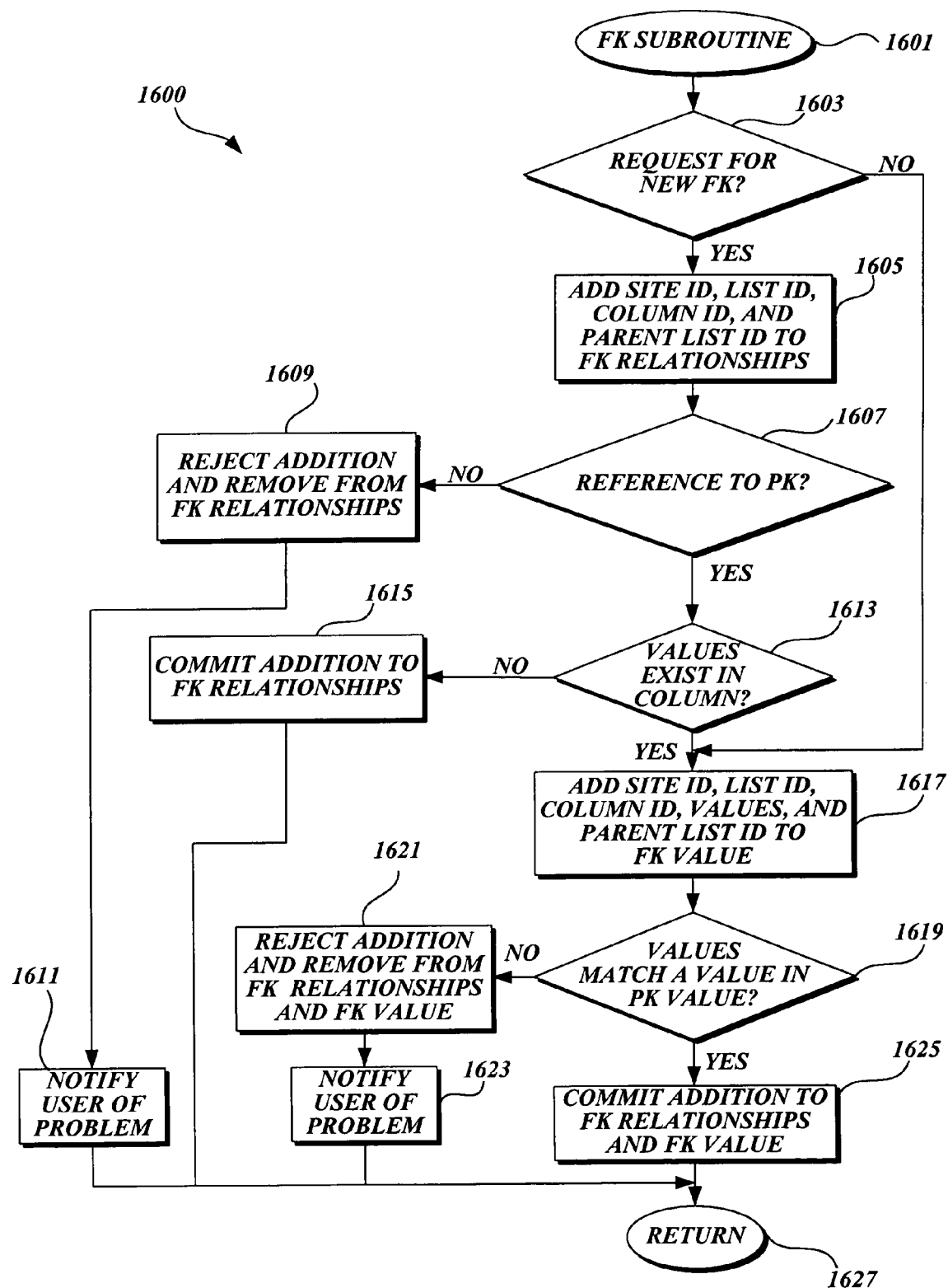
FIG. 16 is a flow diagram of a foreign key ("FK") subroutine for updating and maintaining a foreign key in accordance with an embodiment of the present invention.

FIG. 16 is a flow diagram of a foreign key ("FK") subroutine for updating and maintaining a foreign key in accordance with an embodiment of the present invention. The foreign key subroutine 1600 begins at block 1601, and at decision block 1603, a determination is made as to whether a request for assignment of a new foreign key for a list that is maintained by the data management system has been received. If it is determined at decision block 1603 that a request for assignment of a new foreign key has been received, at block 1605 the site ID, list ID, and column ID for the column, list, and site for which the request is received is added to the foreign key relationships table maintained by the data management system. In addition, the parent list ID that is referenced is also added to the foreign key relationships table. At decision block 1607, a determination is made as to whether the referred to column in the parent list is a primary key. If it is determined at decision block 1607 that the referenced column is not a primary key, at block 1609 the requested addition of a foreign key is rejected and the data added to the foreign key relationships table at block 1605 is removed. In addition, at block 1611, the user requesting the assignment of the foreign key may be notified of the problem and provided the opportunity to remedy the problem or remove the request.

However, if it is determined at decision block 1607 that the referenced column is a primary key, at decision block 1613 a determination is made as to whether values exist in the column that is being assignment as the foreign key. If it is determined at decision block 1613 that the column does not include any values, at block 1615 the data added to the foreign key relationships table at block 1605 is committed and the assignment of the foreign key is allowed.

However, if it is determined at decision block 1613 that values do exist or if it is determined at decision block 1603 that a new request for a foreign key assignment has not been received, at block 1617 the site ID, list ID, column ID, values, and parent list ID are added to the foreign key values table that is maintained by the data management system. In this example, if this is a request for a new foreign key that includes values, all of the values contained in the column are added to the foreign key values table. In contrast, if this is not a request for a new foreign key but instead an addition to an existing foreign key, only the newly added values that do not already exist in the foreign key values table will be added to the foreign key values table. Upon addition of a site ID, list ID, column ID, values, and parent list ID to the foreign key values table at block 1617, at decision block 1619 a determination is made as to whether the values in the foreign key match values in the referenced primary key of the related list. If it is determined at decision block 1619 that the foreign key values do not match primary key values, at block 1621 the requested assignment of a new foreign key or the change to an existing foreign key is rejected and the values added to the foreign key relationships table at block 1605 and the values added to the foreign key value table at block 1607 are removed. Additionally, a user may be notified of the problem at block 1623 and provided the opportunity to correct the problem. However, if it is determined at decision block 1619 that the foreign key values match primary key values, at block 1625 the data added to the foreign key relationships table at block 1605 and the data added to the foreign key values table at block 1617 are committed and the subroutine completes at block 1627.

Figure 17:
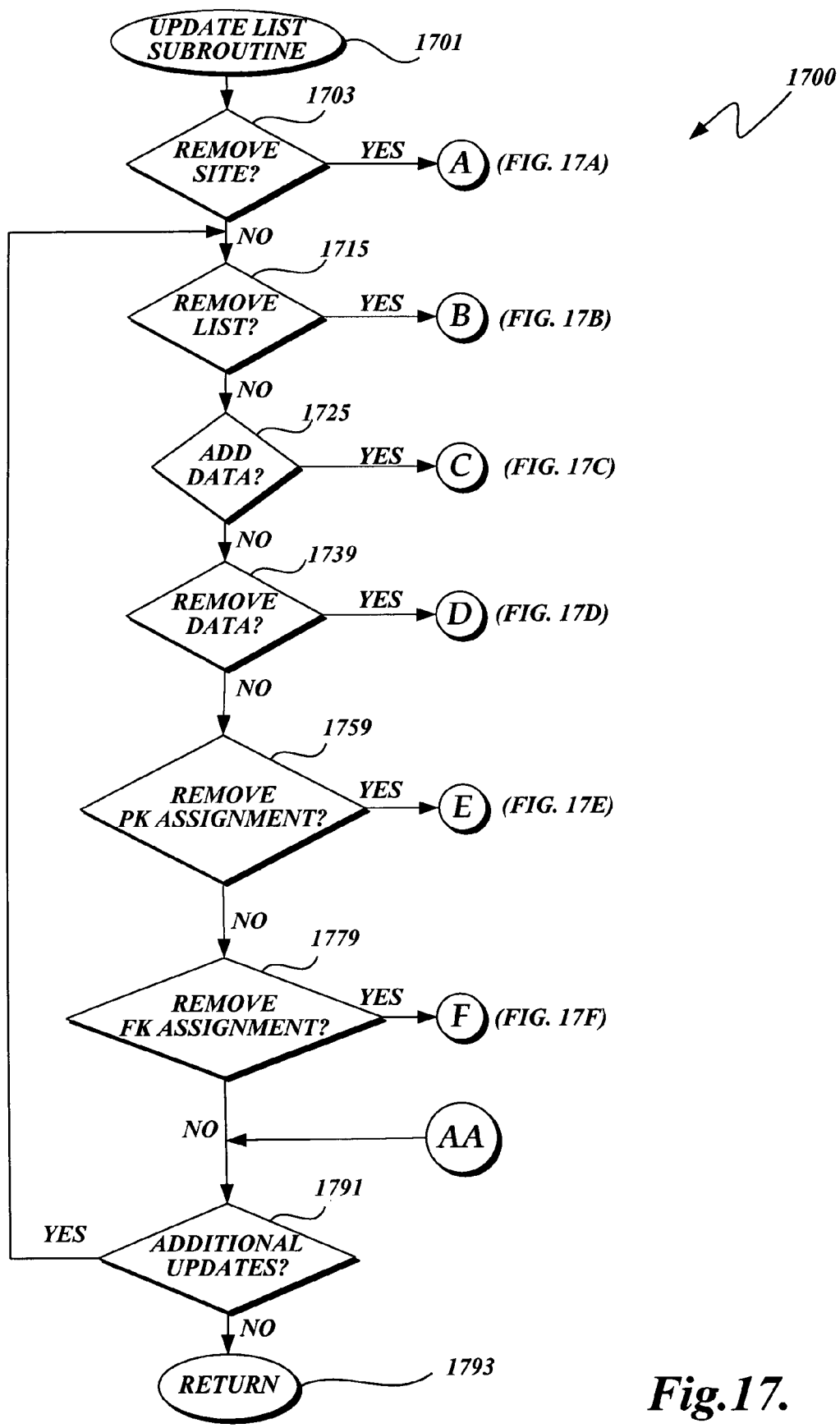
FIGS. 17-17F are flow diagrams of an update list routine for updating lists that are maintained by the database hosting service in accordance with an embodiment of the present invention.
Figure 17A:
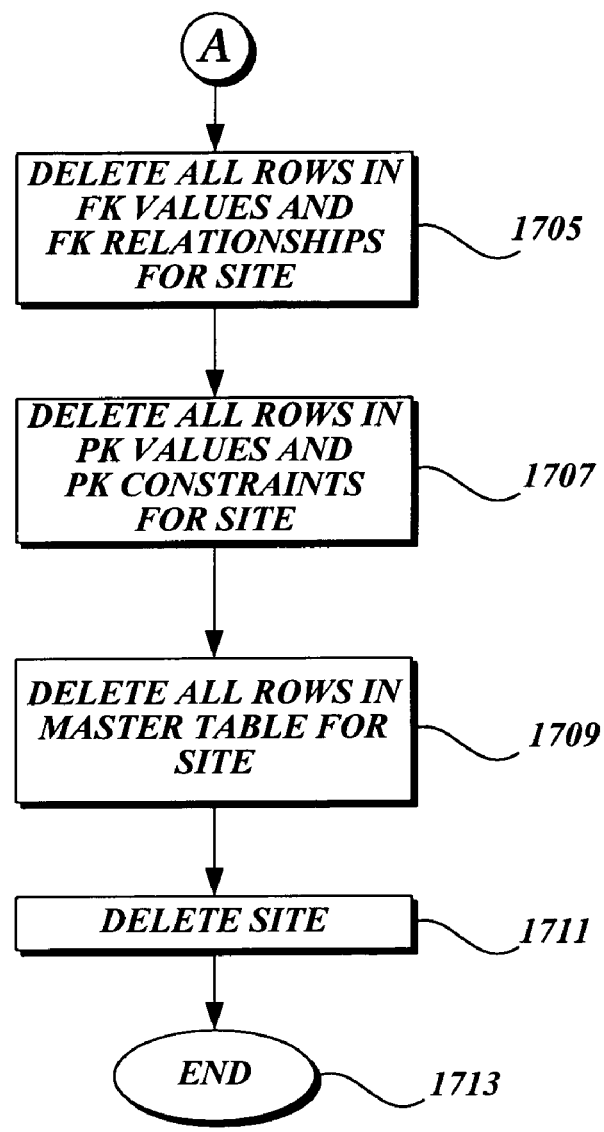
Figure 17B:
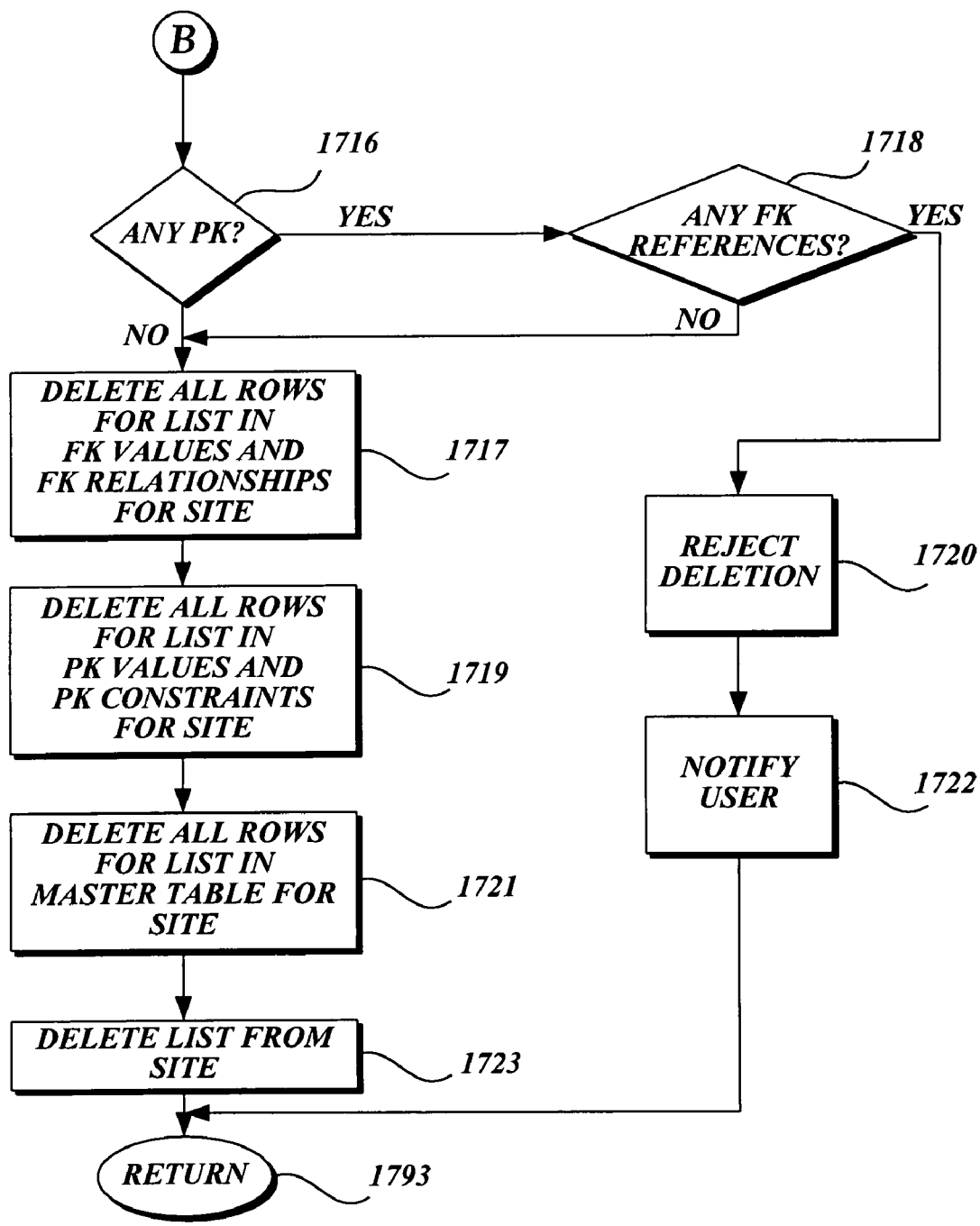
Figure 17C:
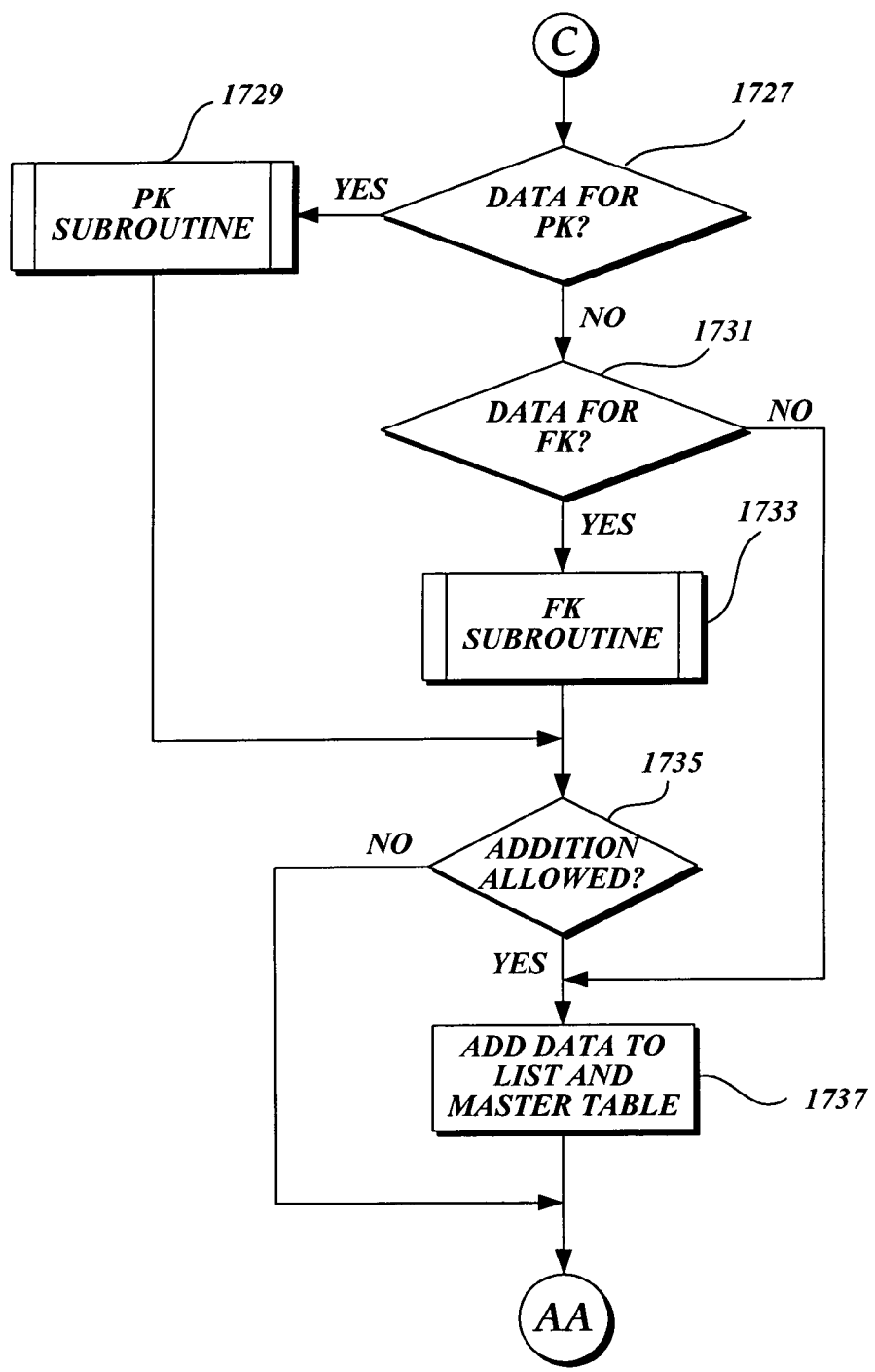
Figure 17D:
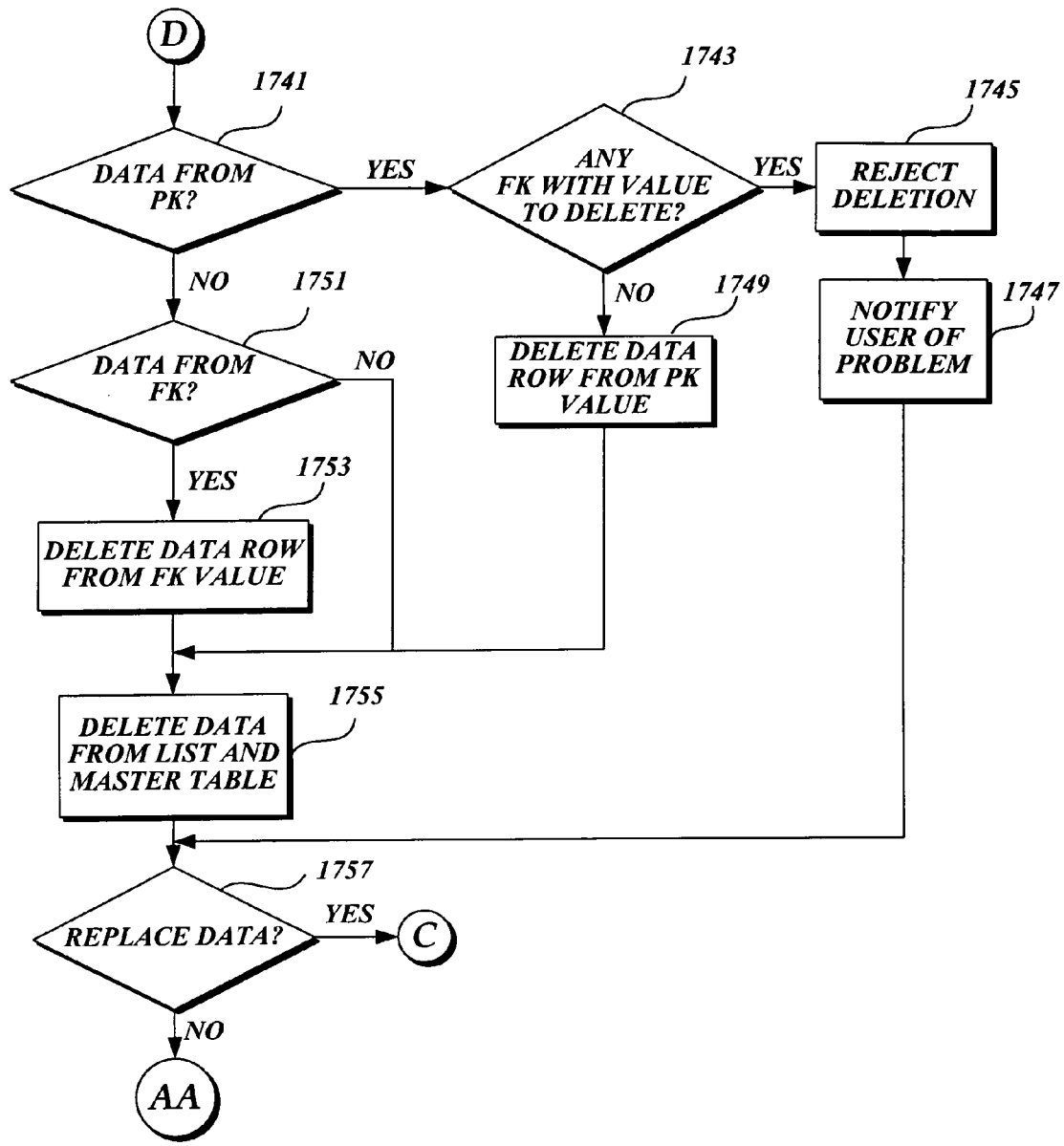
Figure 17E:
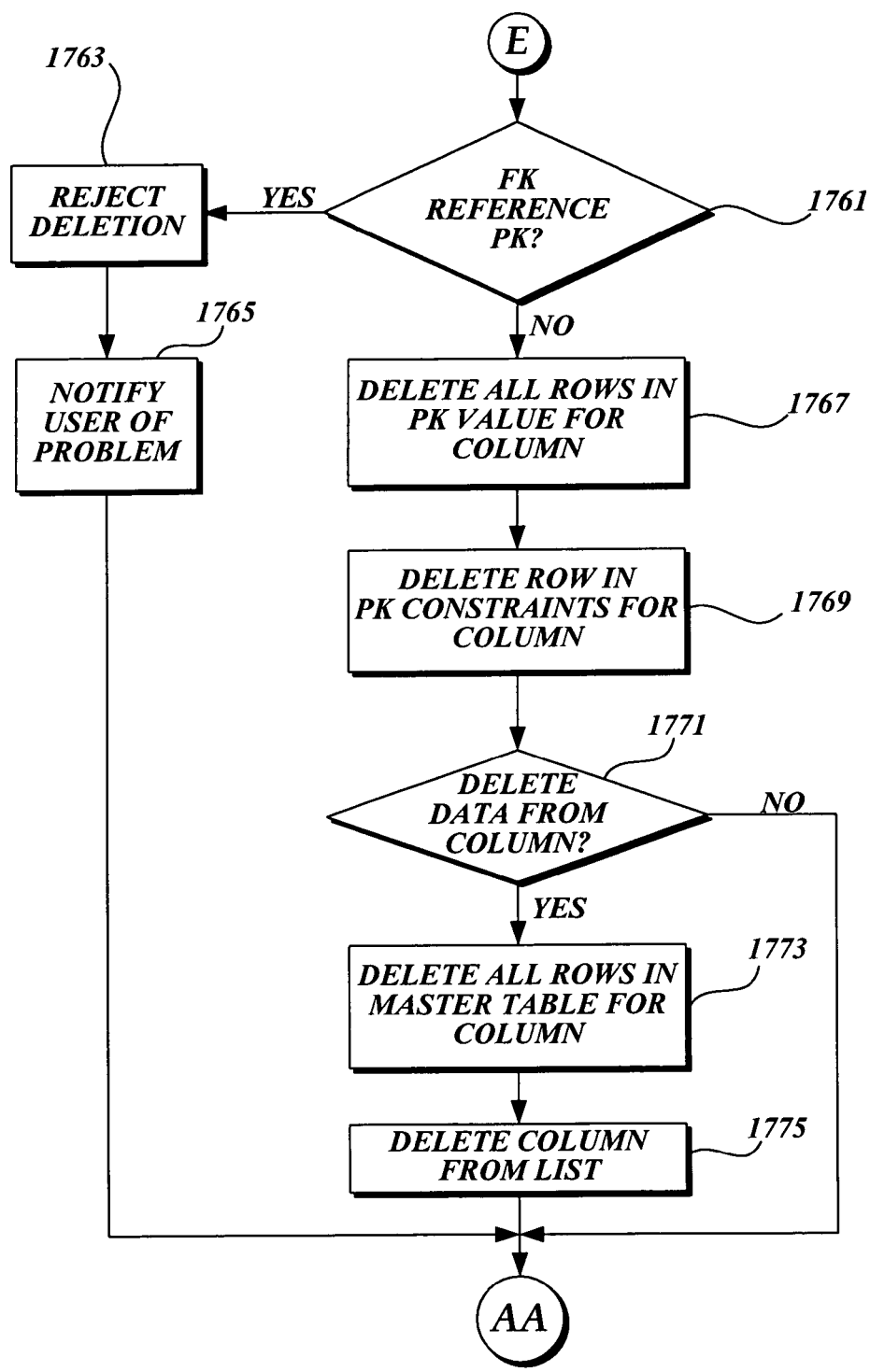
Figure 17F:
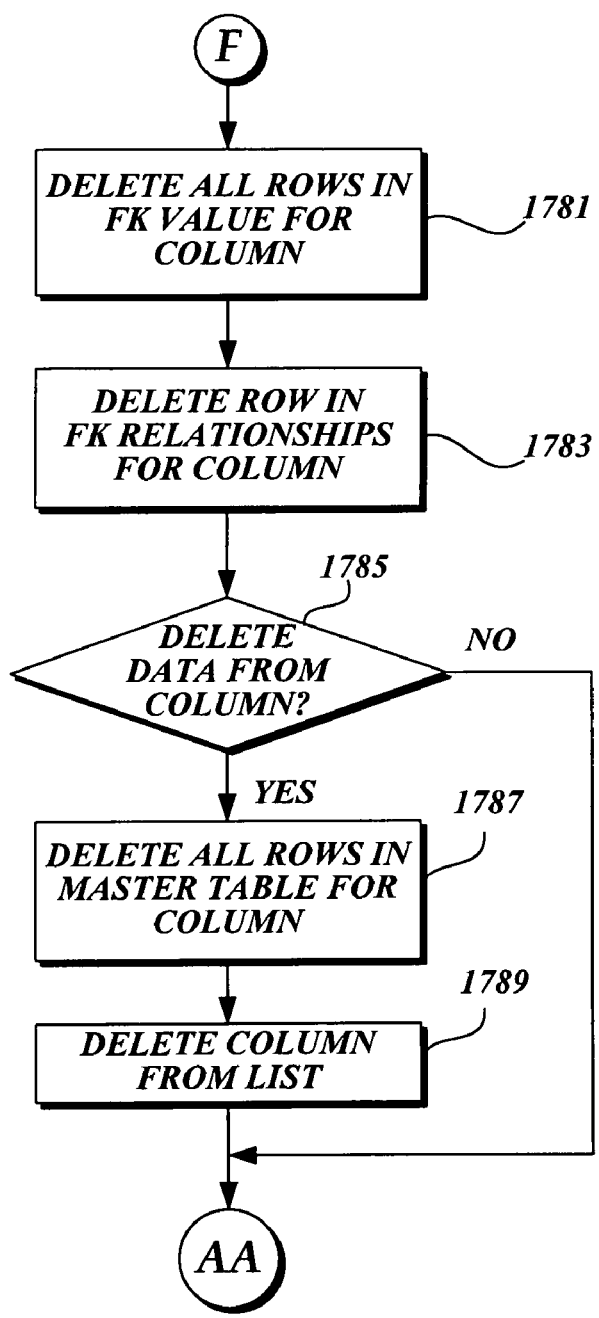

FIGS. 17-17F are flow diagrams of an update list routine for updating lists that are maintained by the database hosting service in accordance with an embodiment of the present invention. The update list subroutine 1700 begins at block

1701, and at decision block 1703, a determination is made as to whether the request received by the database hosting service is a request to remove an entire site. If it is determined at decision block 1703 that the request is to remove an entire site, at block 1705 (FIG. 17A), all rows in the foreign key values table and the foreign key relationships table for the entire site are removed. As discussed above, the foreign key relationships table and the foreign key values table each contain a site ID. Identifying all rows containing the appropriate site ID enables quick deletion from those two tables. At block 1707 all rows in the primary key values table and the primary key constraints table that include that site ID are also removed. Similarly, at block 1709, all rows in the master table that have the site ID are removed. Finally, at block 1711, the logical version of the site is deleted and the routine 1700 completes at block 1713.

Returning to FIG. 17, if it is determined at decision block 1703 that the request is not to remove an entire site, at decision block 1715 a determination is made as to whether the request is to remove a list from a site. If it is determined at decision block 1715 that the request is to remove a list from a site, at decision block 1716 (FIG. 17B), it is determined whether any column in the list to be removed is assigned as a primary key. If a column is assigned as a primary key, at decision block 1718 it is determined whether there are any foreign keys that reference that primary key. If there are foreign keys that reference the primary key, at block 1720 the deletion is rejected. Additionally, at block 1722, a user may be informed of the rejection and provided an opportunity to resolve the problem.

If it is determined at decision block 1716 that there is no primary key, or if it is determined at decision block 1718 that there are no foreign keys referencing the primary key, at block 1717 all rows for the list that are maintained in the foreign key values table and all rows in the list that are maintained in the foreign key relationships table for that site are deleted. As discussed above, both the foreign key values table and the foreign key relationships table maintain, in each row, a site ID and a list ID, thereby allowing easy identification and deletion of a list for a particular site. Additionally, at block 1719, all rows for the list in the primary key values table and the primary key constraints table for that site are similarly removed. At block 1721, all rows for the list in the master table for that site are also removed by identifying all rows that have the appropriate site ID and list ID. Finally, at block 1723, the list is deleted from the site and the routine returns control to the list routine 1400 (FIG. 14).

Returning to FIG. 17, if it is determined at decision block 1715 that the request is not a request to remove the list, at decision block 1725, it is determined whether the request is to add data to an existing list that is maintained by the database hosting service. If it is determined at decision block 1725 that the request is a request to add data to an existing list, at block 1727 (FIG. 17C), a determination is made as to whether the data is being added to a primary key for that list. If it is determined at decision block 1727 that the data to be added is being added to a primary key, the primary key subroutine described with respect to FIG. 15 and illustrated as subroutine block 1729 is performed. However, if it is determined at decision block 1727 that the data is not being added to a primary key, at decision block 1731 a determination is made as to whether the data is being added to a foreign key. If it is determined at decision block 1731 that the data is being added to a foreign key of the list, the foreign key subroutine 1733 is performed, as described above with respect to FIG. 16. Upon completion of either the foreign key subroutine 1733 or the primary key subroutine 1729, at decision block 1735 it is determined whether the requested addition is allowed by the subroutines. If it is determined at decision block 1735 that the requested addition is allowed, or if it is determined at decision block 1731 that the requested addition is not for a foreign key, at block 1737 the data is added to the list and to the master table that is maintained by the database hosting service.

Returning to FIG. 17, if it is determined at decision block 1725 that the request is not a request to add data, at decision block 1739 a determination is made as to whether the request is a request to remove data from the existing list. If it is determined at decision block 1739 that the request is a request to remove data from the existing list, at decision block 1741 (FIG. 17D), a determination is made as to whether the data being removed is from column assigned as a primary key. If it is determined at decision block 1741 that the data being removed is from a primary key, at decision block 1743, a determination is made as to whether there are any foreign keys with the value to be deleted in existence. If it is determined at decision block 1743 that a foreign key contains the value that is to be deleted from the primary key, at block 1745 the requested deletion is rejected and at block 1747, the user may be notified of the problem. However, if it is determined at decision block 1743 that there are no foreign keys that include the value that is to be deleted, at block 1749 the data row containing the value to be deleted that is included in the primary key value table is removed.

Returning to decision block 1741, if it is determined that the data is not from a column assigned as a primary key, at decision block 1751 a determination is made as to whether the data is from a column assigned as a foreign key. If it is determined at decision block 1751 that the data to be removed is from a foreign key, at block 1753 the data row containing that value in the foreign key values table is deleted. Upon deletion of the data from the foreign key values table at block 1753, upon a determination at block 1751 that the data to be removed is not from a foreign key, or upon deletion of the data row from the primary key values table at block 1749, at block 1755 the data row containing the data to be deleted is removed from the master table. At decision block 1757 a determination is made as to whether the data that is being deleted is to be replaced by additional data. Such a determination may be made if the user is doing an insert or replace and is not only deleting data. If it is determined at decision block 1757 that the data is to be replaced, the routine returns to block 1727 (FIG. 17C) and continues.

Returning to FIG. 17, if it is determined at decision block 1739 that the request is not a request to remove data from the existing list, at decision block 1759 a determination is made as to whether a primary key assignment is to be removed from an existing column of an existing list. If it is determined at decision block 1759 that a primary key assignment is to be removed from a column of an existing list, at block 1761 (FIG. 17E), a determination is made as to whether a foreign key currently references the primary key that is to have its assignment removed. If it is determined at decision block 1761 that a foreign key currently references the primary key, at block 1763 the deletion is rejected and at block 1765 a user may be notified that a foreign key currently references the column assigned as the primary key. However, if it is determined at decision block 1761 that a foreign key does not currently reference the primary key, at block 1767 all rows in the primary key values table for the column for that list are removed. Likewise, the row in the primary key constraints table for that primary key is also deleted, thereby removing the primary key relationship from the column.

At decision block 1771, a determination is made as to whether the data from the column is also to be deleted. If it is determined at decision block 1771 that the data is also to be deleted from the column, at block 1773 all rows in the master table for that column for that list, for that site, are deleted. At block 1775, the column is deleted from the list.

Returning to FIG. 17, if it is determined at decision block 1759 that the request is not a request to remove a primary key assignment, at decision block 1779 a determination is made as to whether the request is a request to remove a foreign key assignment. If it is determined at decision block 1779 that the request is a request to remove a foreign key assignment, at block 1781 (FIG. 17F), all rows in the foreign key value table for that column, for that list, for that site are deleted. Additionally, at block 1783 all rows in the foreign key relationships table for that column, for that list, for that site are likewise deleted. At decision block 1785, a determination is made as to whether the data from the column is also to be deleted. If it is determined at decision block 1785 that the data from the column is to be deleted, at block 1787 the data is deleted from the master table maintained by the database hosting service and at block 1789, the column is deleted from the list.

Upon completion of the flow branches described in FIGS. 17C-17F and return to the main flow described in FIG. 17 as illustrated by terminal AA, at decision block 1791 a determination is made as to whether additional updates are to be performed on a list that is maintained by the database hosting service. If it is determined at decision block 1791 that additional updates are to be performed, control returns to decision block 1715 and continues. However, if it is determined at decision block 1791 that no additional updates are to be performed, the routine 1700 completes and returns control to the list routine 1400, as illustrated by block 1793.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for providing primary keys for a plurality of lists of a plurality of sites maintained by a database hosting service on one or more servers, wherein data from the plurality of lists are maintained in a single master table, comprising:
   receiving, by the database hosting service on one or more servers, an assignment request for a primary key from a list of the plurality of lists; wherein the database hosting service maintains the single master table that comprises rows and columns; wherein the master table comprises at least one row for each of the plurality of sites; wherein each of the rows comprise a row storing a list identifier, a site identifier, and value columns;
   determining a site identifier for the site from which the request was received;
   determining a list identifier for the list from which the request was received;
   determining a column identifier that is to be assigned as the primary key, the column identifier including the identifier of the column in the list to be assigned as the primary key; and
   determining whether a combination of the determined site identifier, list identifier and column identifier exists in a primary key constraints table;
   in response to determining the combination of the determined site identifier, list identifier and column identifier do not exist in a primary key constraints table:
      storing data on the database hosting service on one or more servers, the data including:
         a record of the determined site identifier, list identifier and column identifier in the primary key constraints table; and
         a record of the value associated with the site identifier, the list identifier and the column identifier in a primary key values table.

2. The computer-implemented method of claim 1 further comprising:
   in response to determining the determined site identifier, list identifier and column identifier exist in a primary key constraints table:
      rejecting the assignment request; and
      notifying a user of the rejection of the primary key in response to rejecting the assignment request.

3. The computer-implemented method of claim 1, wherein values contained in a column assigned as a primary key are unique.

4. The computer-implemented method of claim 1, further comprising:
   determining value contained in a column identified by the column identifier;
   maintaining a record of the determined value, list identifier, and site identifier; and
   confirming that a combination of the site identifier, list identifier, and value is unique.

5. The computer-implemented method of claim 4, wherein the record is maintained in a table containing records identifying values for primary keys for a plurality of lists for the plurality of sites.

6. The computer-implemented method of claim 4, wherein the record of the determined value, list identifier, and site identifier is maintained by the database hosting service.

7. The computer-implemented method of claim 1, wherein the combination of the site identifier and list identifier are unique for each site and list combination.

8. A computer readable storage medium tangibly embodying a program of instructions executable by a computer for maintaining foreign keys for a plurality of lists for a plurality of sites maintained by a database hosting service, the database hosting service having a processor configured to execute components embodied on the computer readable medium, the components comprising:
   a processing component for maintaining a single master table, wherein the single master table comprises rows and columns; wherein the master table comprises at least one row for each of the plurality of sites; wherein each of the rows comprise a row storing a list identifier, a site identifier, and value columns;
   a processing component for receiving a foreign key assignment and determining a site identifier, list identifier, column identifier, and related list identifier for the foreign key assignment, the processing component storing a record of the site identifier, the list identifier, the column identifier and the related list identifier in a foreign key relationships table;
   a foreign key values component maintaining the determined site identifier, list identifier, column identifier, and related list identifier, and determining a value contained in a column identified by the column identifier, the foreign key values component storing a record of the value in association with the site identifier, the list identifier, the column identifier and the related list identifier in a foreign key value table; and
   a referential integrity component, confirming that the determined value matches a value contained in a column of a list identified by the related list identifier.

9. The computer readable storage medium of claim 8, wherein a combination of the site identifier, list identifier, and column identifier are unique.

10. The computer readable storage medium of claim 8, wherein the related list identifier identifies a list containing a column assigned as a primary key that is referenced by the foreign key.

11. The computer readable storage medium of claim 8, further comprising:
   a foreign key relationships component maintaining a site identification, list identification, column identification and related list identification for a plurality of foreign keys.

12. The computer readable storage medium of claim 9, wherein the combination defines a foreign key assignment for a column of a list of a site maintained by the database hosting service.

13. A computer system for hosting a plurality of sites containing a plurality of lists, the computer system comprising:
   one or more databases storing information that is managed for the plurality of sites containing the plurality of lists, each list storing values; and
   a computing device in communication with the one or more databases, the computing device configured to:
      generate a single master table that is maintained by a host that hosts the plurality of sites, wherein the single master table comprises rows and columns, wherein the rows and columns of the single master table contain the values in association with the plurality of lists for the plurality of sites, the values included in the plurality of lists, the master table maintaining for each of the plurality of sites a row storing a list identifier, a site identifier, and value columns that comprise a pre-set number of integer columns and a pre-set number of character columns; for storing values; wherein each of the values is stored in a list identified by the list identifier and the list is associated with a site identified by the site identifier;
      generate a foreign key value table maintaining values of a plurality of foreign keys for the plurality of lists, the foreign key value table maintaining at least one row, the at least one row storing the site identifier, the list identifier, a column identifier, a parent list identifier and the value, wherein the column identifier specifies a column in a parent list identified by the parent list identifier that is a primary key and the value is any one of the values maintained in the column of the parent list;
      generate a primary key value table maintaining values of a plurality of primary keys for the plurality of lists, the primary key value table maintaining at least one row, the at least one row storing the site identifier, the list identifier, and the value; wherein the combination of the site identifier, the list identifier and the value is unique.

14. The computer system of claim 13, wherein the master table includes a row for each value of each list.

15. The computer system of claim 14, wherein each row includes a site identifier, list identifier, and a value.

16. The computer system of claim 13, wherein the computing device is further configured to confirm whether a foreign key references a value in a primary key before deleting the value from the primary key.

17. The computer system of claim 13, wherein the computing device is further configured to confirm whether a value is included in a referenced primary key before adding the value to a foreign key.

18. The computer system of claim 13, wherein the computing device is further operative to:
   generate a primary key constraints table, the primary key constraints table maintaining at least one row, the at least one row storing the site identifier, the list identifier and the column identifier.

19. The computer system of claim 18, wherein the computing device is further operative to:
   generate a foreign key relationships table, the foreign key relationships table maintaining at least one row, the at least one row storing the site identifier, the list identifier and the column identifier and a parent list identifier.

20. The computer system of claim 19, wherein the foreign key value table further includes a related list identifier identifying a list containing a primary key referenced by the foreign key; and
   wherein the computing device is further configured to confirm that a row in the primary key value table exists that includes a same site identifier, value, and related list identifier prior to adding a value to a foreign key.

* * * * *